US012040906B2

(12) United States Patent
Li et al.

(10) Patent No.: US 12,040,906 B2
(45) Date of Patent: Jul. 16, 2024

(54) ENCODED SIGNAL DEMODULATION METHOD, APPARATUS, DEVICE, AND COMPUTER READABLE STORAGE MEDIUM

(71) Applicant: AMLOGIC (SHANGHAI) CO., LTD, Shanghai (CN)

(72) Inventors: Chenglin Li, Shanghai (CN); Ben Yang, Shanghai (CN); Xiaotong Liu, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 251 days.

(21) Appl. No.: 17/443,268

(22) Filed: Jul. 23, 2021

(65) Prior Publication Data
US 2022/0029757 A1 Jan. 27, 2022

(30) Foreign Application Priority Data

Jul. 24, 2020 (CN) .......................... 202010725787.3

(51) Int. Cl.
| | |
|---|---|
| H04L 1/00 | (2006.01) |
| H04L 1/20 | (2006.01) |
| H04L 7/10 | (2006.01) |
| H04L 25/03 | (2006.01) |
| H04L 27/00 | (2006.01) |
| H04L 27/14 | (2006.01) |
| H04L 27/233 | (2006.01) |

(52) U.S. Cl.
CPC ............. *H04L 1/206* (2013.01); *H04L 7/10* (2013.01); *H04L 25/03286* (2013.01); *H04L 27/0008* (2013.01); *H04L 27/14* (2013.01); *H04L 27/2338* (2013.01); *H04L 2203/04* (2013.01)

(58) Field of Classification Search
None
See application file for complete search history.

(56) References Cited

U.S. PATENT DOCUMENTS

| | | | | |
|---|---|---|---|---|
| 6,968,021 | B1 * | 11/2005 | White | H04L 1/005 714/799 |
| 7,088,793 | B1 * | 8/2006 | Mickelson | H04L 1/0066 714/795 |
| 7,769,096 | B2 * | 8/2010 | Fonseka | H04L 27/2025 375/259 |
| 8,959,419 | B1 * | 2/2015 | Sethi | H04L 1/0054 714/795 |
| 10,924,311 | B1 * | 2/2021 | Kenawy | H04L 27/14 |
| 2008/0118002 | A1 * | 5/2008 | Fonseka | H04L 27/2025 370/480 |
| 2010/0262896 | A1 * | 10/2010 | Dowling | H04L 1/0041 714/795 |

(Continued)

OTHER PUBLICATIONS

Extended European Search Report of Dec. 22, 2021 for European Patent Application No. 21187229.6. 13 pages.

(Continued)

*Primary Examiner* — Mujtaba M Chaudry
(74) *Attorney, Agent, or Firm* — Knobbe, Martens, Olson & Bear, LLP

(57) ABSTRACT

The present disclosure relates to an encoded signal demodulation method, apparatus, and device. Some embodiments of the present disclosure are beneficial to improving demodulation performance.

20 Claims, 7 Drawing Sheets

(56) References Cited

U.S. PATENT DOCUMENTS

2023/0308324 A1* 9/2023 Ryan ............... H04L 27/2017

OTHER PUBLICATIONS

Messai, Malek, et al., "A low complexity coherent CPM receiver with modulation index estimation", 2014 $22^{nd}$ European Signal Processing Conference (EUSIPCO), EURASIP, Sep. 1, 2014, pp. 979-983.

Lampe, Lutz, et al., "Noncoherent Sequence Detection Receiver or Bluetooth Systems", IEEE Journal on Selected Areas in Communications, IEEE Service Center, Piscataway, US. vol. 23, No. 9, Sep. 1, 2005, pp. 1718-1727.

Soltanian A, et al., "Performance of the Bluetooth System in Fading Dispersive Channels and Interference", Globecom '01: IEEE Global Telecommunication Conference; San Antonio, TX Nov. 25-29, 2001. IEEE Operations Center Piscataway, NJ. vol. 6, Nov. 25, 2001, pp. 3499-3503.

Speth M, et al., "MLSE based detection for GFSK signals with arbitrary modulation index", Communications, 2004 International Zurich Seminar on Zurich, Switzerland, Feb. 18-20, 2004, Piscataway, NJ. Feb. 18, 2004, pp. 228-231.

\* cited by examiner

ENCODED SIGNAL DEMODULATION METHOD, APPARATUS, DEVICE, AND COMPUTER READABLE STORAGE MEDIUM

TECHNICAL FIELD

The present disclosure relates to the technical field of wireless communication, and in particular, to an encoded signal demodulation method, apparatus, device and a computer readable storage medium.

BACKGROUND

In the field of wireless communication, during the transmission of information, the sender modulates the information (voice, data) onto a carrier wave and sends it out; the receiver recovers the transmitted information by synchronization and demodulation.

CPM (continuous phase modulation) is a nonlinear modulation method that carries information through the carrier phase, GFSK (Gauss Frequency Shift Keying) is a kind of continuous phase modulation, which is a modulation method to limit the spectrum width of the signal through a Gaussian low-pass filter before modulation, for the CPM or GFSK used by some devices, such as Bluetooth, in order to meet its requirements of low-power characteristics For the CPM or GFSK used by some devices, such as Bluetooth, in order to meet its requirements of low-power characteristics, which will use analog devices, which leads to its modulation index will exist a certain degree of uncertainty, and in order to achieve the communication of the above devices, the standard protocol provides that the modulation index of Bluetooth, can have a certain range of values, which also leads to a certain ambiguity of the modulation index of GFSK for such devices as Bluetooth.

To achieve encoding demodulation of GFSK or other devices with ambiguity in the modulation index of CPM, the main methods used are differential demodulation and matched filter bank demodulation, etc., but the performance of the above encoded signal demodulation methods is low.

Therefore, how to improve the demodulation performance of devices with encoding and with modulation index range becomes an urgent technical problem to be solved.

SUMMARY

Some embodiments of the present disclosure provide an encoded signal demodulation method, apparatus, device and a computer readable storage medium, to improve the demodulation performance of devices with encoding and with modulation index range.

In some embodiments, an encoded signal demodulation method includes:
  obtaining a local ideal signal corresponding to each state at a current moment based on a phase-free information waveform of each state at the current moment and a practical accumulated phase corresponding to each state at the current moment, wherein each state is determined based on a first predetermined number of information bits and each fixed accumulated phase corresponding to a first modulation index, the fixed accumulated phase is obtained based on the first modulation index, the practical accumulated phase of a previous moment and each encoded information bits of the previous moment, the phase-free information waveform at each current moment is obtained based on a second modulation index, a second predetermined number of encoded information bits before the current moment and each encoded information bits of the current moment, the practical accumulated phase of each current moment is obtained based on the second modulation index, the practical accumulated phase of the previous moment and each encoded information bits of the previous moment, the first modulation index is a rational number in a range of modulation indices, the second modulation index is any value in the range of modulation indices, the first predetermined number is equal to the memory depth of encoding rules;
  obtaining a branch metric for each branch path at the current moment based on each local ideal signal and a received signal corresponding to the local ideal signal;
  obtaining each modulation index error correction path metric for the current moment based on the branch metric for each state at the current moment, and at least one of a survivor path metric for a survivor path of the previous moment and a third predetermined number of surviving branch metrics for the survivor path of the previous moment, comparing modulus of each modulation index error correction path metric into the same state, and obtaining the survivor path metric, survivor paths and information bits before encoding for each state at the current moment that satisfies the requirements;
  in response to a determination that the received signal is a non-ending signal, jumping to each state of a next moment until a backtracking predetermined requirement is reached, and backtracking any of the survivor paths of each state at the current moment, and outputting the information bits before encoding corresponding to a backtracking moment.

The technical solutions of embodiments of the present disclosure have the following advantages: the encoded signal demodulation method, apparatus, device and the computer readable storage medium provide by embodiments of the present disclosure, wherein the encoded signal demodulation method, first, on the one hand, determines a rational number falling within the range of modulation indices based on the range of modulation indices of the device and uses it as a first modulation index, and then determines each state in combination with a first predetermined number of information bits before the current moment, and further obtains a phase-free information waveform for each state at the current moment based on a second predetermined number of encoded information bits before the current moment and each encoded information bits of the current moment, on the other hand, obtains the practical accumulated phase based on the second modulation index, the practical accumulated phase of the previous moment and each encoded information bits of the current moment, and then obtains each local ideal signal of the current moment of each state based on the phase-free information waveform of each state each encoded and each practical accumulated phase; then, obtains each branch metric based on each local ideal signal and the received signal; and obtains each modulation index error correction path metric for the current moment based on either the branch metric for the current moment and the survivor path metric for the survivor path of the previous moment or a third predetermined number of surviving branch metrics, and after comparison, obtains the survivor path metric, survivor paths, and information bits before encoding, in response to a determination that the received signal is a non-ending signal, jumping to each state of a next moment until a backtracking predetermined requirement is reached, and backtracking any of the survivor paths of each state at the current moment, and outputting the information bits before encoding corresponding to a backtracking moment.

In this way, the encoded signal demodulation method, apparatus, device, and the computer readable storage medium provided by embodiments of the present disclosure can ensure the feasibility of the modulation method provided by the embodiment of the present disclosure using the Viterbi algorithm by using the rational number within the range of modulation indices as the first modulation index on the one hand, and determining each state using the fixed accumulated phase corresponding to the first modulation index, so that the device with modulation index range has a controllable number of states. At the same time, determines the practical accumulated phase based on the second modulation index, the practical accumulated phase of the previous moment and each encoded information bits of the current moment, so that the practical accumulated phase is different from the fixed accumulated phase, which can reduce the large error caused by the first modulation index corresponding to the fixed accumulated phase; further, to ensure the accuracy of the subsequent survivor path determination and to avoid the accumulation of errors due to the use of the second modulation index and the difference between the second modulation index and the first modulation index, obtains an error correction path metric for each modulation index at the current moment based on one of the current moment branch metric, and the survivor path metric for the survivor paths of the previous moment or the third predetermined number of branch metrics, and determines the survivor path metric, survivor path and information bits before encoding for each state by comparing the modulus of the modulation index error correction path metric to improve the accuracy of the determination of the survivor path metric, survivor path and information bits before encoding. Thereby, the encoded signal demodulation method provided by the embodiments of the present disclosure can reduce the effect of errors caused by the modulation index and improve demodulation performance based on the realization of demodulation of signals from devices with a modulation index range, and meanwhile be able to achieve demodulation for encoding devices.

In some embodiments, an encoded signal demodulation apparatus, comprising:

a local ideal signal acquisition unit, used for obtaining a local ideal signal corresponding to each state at a current moment based on a phase-free information waveform of each state at the current moment and a practical accumulated phase corresponding to each state at the current moment, wherein each state is determined based on a first predetermined number of information bits and each fixed accumulated phase corresponding to a first modulation index, the fixed accumulated phase is obtained based on the first modulation index, the practical accumulated phase of a previous moment and each encoded information bits of the previous moment, the phase-free information waveform at each current moment is obtained based on a second modulation index, a second predetermined number of encoded information bits before the current moment and each encoded information bits of the current moment, the practical accumulated phase of each current moment is obtained based on the second modulation index, the practical accumulated phase of the previous moment and each encoded information bits of the previous moment, the first modulation index is a rational number in a range of modulation indices, the second modulation index is any value in the range of modulation indices, the first predetermined number is equal to the memory depth of encoding rules;

a branch metric acquisition unit, used for obtaining a branch metric for each branch path at the current moment based on each local ideal signal and a received signal corresponding to the local ideal signal;

an addition comparison selection—survivor path determination—metric recording unit, used for obtaining each modulation index error correction path metric for the current moment based on the branch metric for each state at the current moment, and at least one of a survivor path metric for a survivor path of the previous moment and a third predetermined number of surviving branch metrics for the survivor path of the previous moment, comparing modulus of each modulation index error correction path metric into the same state, and obtaining the survivor path metric, survivor paths and information bits before encoding for each state at the current moment that satisfies the requirements;

a state jumping and backtracking output unit, used for jumping to each state of a next moment until a backtracking predetermined requirement is reached in response to a determination that the received signal is a non-ending signal, and backtracking any of the survivor paths of each state at the current moment, and outputting the information bits corresponding to a backtracking moment.

In some embodiments, an encoded signal demodulation device, comprising a synchronizer and a demodulator, wherein the synchronizer obtains the initial signal of the signal to obtain a received signal, and transmits the received signal to the demodulator, the demodulator performs the encoded signal demodulation method provided by the present disclosure.

In some embodiments, an encoded signal demodulation device, comprising at least one memory and at least one processor; the memory storing a program, the processor calling the program to perform the encoded signal demodulation method provided by the present disclosure.

In some embodiments, a computer readable storage medium, wherein the computer readable storage medium stores a program suitable for encoded signal demodulation to implement the encoded signal demodulation method provided by the present disclosure.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
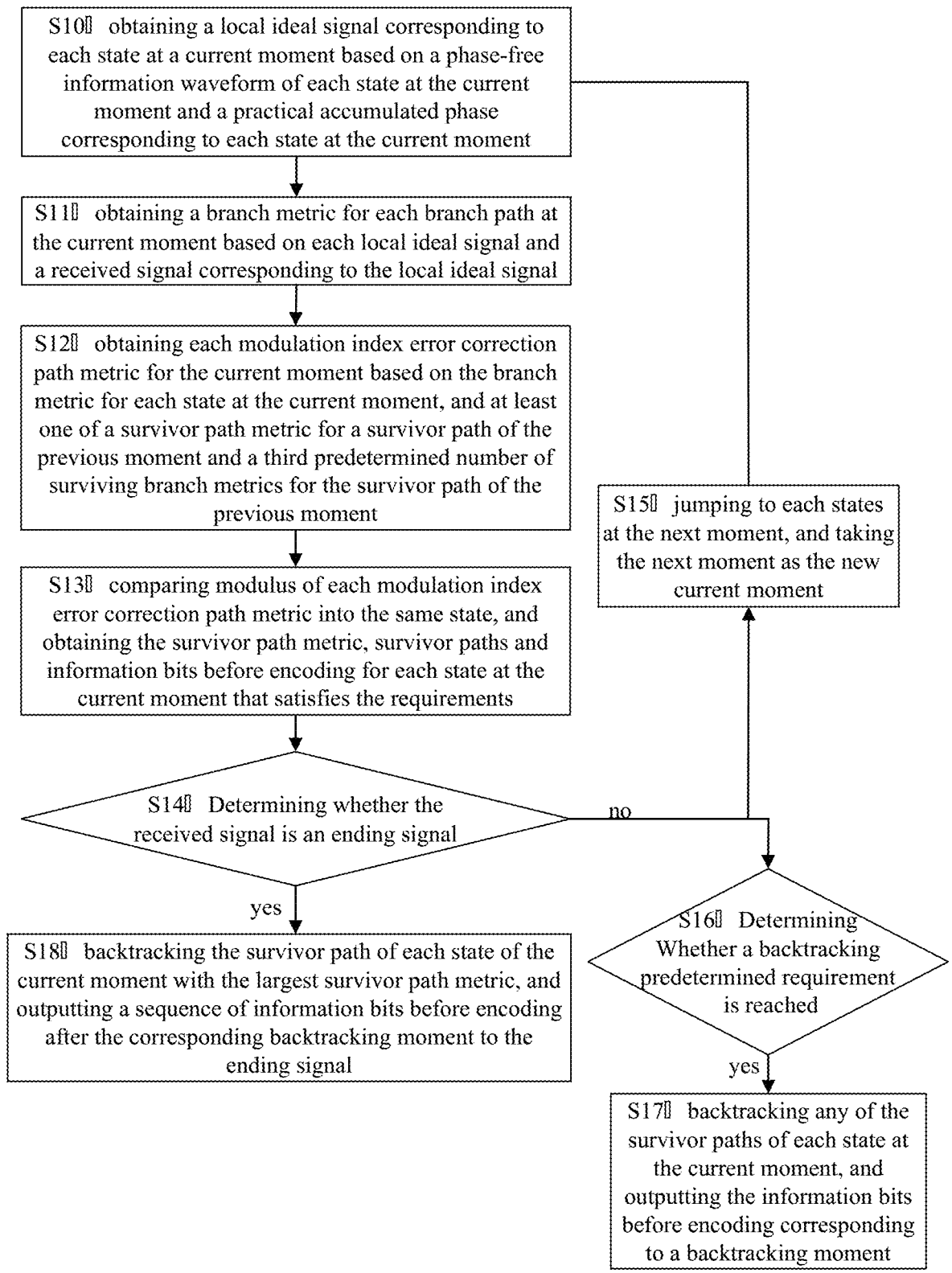
FIG. 1 is a schematic diagram of a flow of the encoded signal demodulation method provided by an embodiment of the present disclosure.

The information demodulation performance in the prior art is low for devices with encoding and with modulation indices in the modulation index range.

To improve the demodulation performance, the embodiments of the present disclosure provide an encoded signal demodulation method, comprising:

obtaining a local ideal signal corresponding to each state at a current moment based on a phase-free information waveform of each state at the current moment and a practical accumulated phase corresponding to each state at the current moment, wherein each state is determined based on a first predetermined number of information bits and each fixed accumulated phase corresponding to a first modulation index, the fixed accumulated phase is obtained based on the first modulation index, the practical accumulated phase of a previous moment and each encoded information bits of the previous moment, the phase-free information waveform at each current moment is obtained based on a second modulation index, a second predetermined number of encoded information bits before the current moment and each encoded information bits of the current moment, the practical accumulated phase of each current moment is obtained based on the second modulation index, the practical accumulated phase of the previous moment and each encoded information bits of the previous moment, the first modulation index is a rational number in a range of modulation indices, the second modulation index is any value in the range of modulation indices, the first predetermined number is equal to the memory depth of encoding rules;

obtaining a branch metric for each branch path at the current moment based on each local ideal signal and a received signal corresponding to the local ideal signal;

obtaining each modulation index error correction path metric for the current moment based on the branch metric for each state at the current moment, and at least one of a survivor path metric for a survivor path of the previous moment and a third predetermined number of surviving branch metrics for the survivor path of the previous moment, comparing modulus of each modulation index error correction path metric into the same state, and obtaining the survivor path metric, survivor paths and information bits before encoding for each state at the current moment that satisfies the requirements;

in response to a determination that the received signal is a non-ending signal, jumping to each state of a next moment until a backtracking predetermined requirement is reached, and backtracking any of the survivor paths of each state at the current moment, and outputting the information bits before encoding corresponding to a backtracking moment.

It can be seen that, the encoded signal demodulation method, on one hand, can ensure the feasibility of the modulation method provided by the embodiment of the present disclosure using the Viterbi algorithm by using the rational number within the range of modulation indices as the first modulation index, and determining each state using the fixed accumulated phase corresponding to the first modulation index, so that the device with modulation index range has a controllable number of states. At the same time, determines the practical accumulated phase based on the second modulation index, the practical accumulated phase of the previous moment and each encoded information bits of the current moment, so that the practical accumulated phase is different from the fixed accumulated phase, which can reduce the large error caused by the first modulation index corresponding to the fixed accumulated phase; further, to ensure the accuracy of the subsequent survivor path determination and to avoid the accumulation of errors due to the use of the second modulation index and the difference between the second modulation index and the first modulation index, obtains an error correction path metric for each modulation index at the current moment based on one of the current moment branch metric, and the survivor path metric for the survivor paths of the previous moment or the third predetermined number of branch metrics, and determines the survivor path metric, survivor path and information bits before encoding for each state by comparing the modulus of the modulation index error correction path metric to improve the accuracy of the determination of the survivor path metric, survivor path and information bits before encoding. Thereby, the encoded signal demodulation method provided by the embodiments of the present disclosure can reduce the effect of errors caused by the modulation index and improve demodulation performance based on the realization of demodulation of signals from devices with a modulation index range, and meanwhile be able to achieve demodulation for encoding devices.

The technical solutions in the embodiments of the present disclosure will be clearly and completely described below in conjunction with the accompanying drawings in the embodiments of the present disclosure. Obviously, the described embodiments are only a part of the embodiments of the present disclosure and not all of them. Based on the embodiments in the present disclosure, all other embodiments obtained by a person of ordinary skill in the art without creative labor fall within the scope of protection of the present disclosure.

The encoded signal demodulation method provided by embodiments of the present disclosure, realizes information demodulation of devices whose modulation indices take values in the range of modulation indices, and increasing the transmission range of the signals using coding (e.g., convolutional coding), for ease of understanding, in a specific implementation, the specific device may include LE2S (using a convolutional code with a code rate of ½, the 1 information bit before encoding, after encoding, becomes 2 information bits) and LE8S (on the basis of using the convolutional code with a code rate of ½, the spread spectrum coding is used again to encode 1 information bit before encoding, which becomes 2 information bits after encoding, and then encoded by 4 times spread spectrum, 1 spread spectrum into 1100 and 0 spread spectrum into 0011 to get 8 information bits). Of course, the specific way of coding can also be other ways.

Please refer to FIG. 1, FIG. 1 is a schematic diagram of a flow of the encoded signal demodulation method provided by an embodiment of the present disclosure.

As shown in the figure, the demodulation method provided in the embodiment of the present disclosure, comprises the following steps:

Step S10: obtaining a local ideal signal corresponding to each state at a current moment based on a phase-free information waveform of each state at the current moment and a practical accumulated phase corresponding to each state at the current moment.

In order to realize the information demodulation, it is necessary to obtain the local ideal signal first. Of course, the local ideal signal is the local ideal signal corresponding to each state at the current moment.

To do this, it is first necessary to determine the specific state and the number of states.

In this embodiment, each state may be determined based on a first predetermined number of information bits and a fixed accumulated phase corresponding to a first modulation index.

Wherein the fixed accumulated phase can be obtained based on the first modulation index, the practical accumulated phase of a previous moment and each encoded information bits of the previous moment.

While for the practical accumulated phase of the first moment, i.e. the initial practical accumulated phase can be determined in a custom way.

Specifically, for LE2S, the fixed accumulated phase corresponding to the first modulation index can be calculated by the following equation:

$$\theta_{n+1}^{state} = R_{2\pi}[\theta_n^{state} + \pi h_{state}(I_{n-Lc}^{c1} + I_{n-Lc}^{c2})]$$

wherein: $\theta_{n+1}^{state}$ represents the fixed accumulated phase at the current moment;

$\theta_n^{state}$ represents the fixed accumulated phase of the previous moment;

$h_{state}$ represents the first modulation index;

$I_{n-L}^{c1}$, $I_{n-L}^{c2}$ represent the sequence of encoded information bits about to leave at the previous moment;

$R_{2\pi}[*]$ represents taking the remainder of the angle value in [ ].

It is easy to understand that when performing the calculation of the fixed accumulated phase, the encoded information bits that are about to leave at the previous moment are shifted down by one $\pi h_{state}$ they are 0, therefore, when the encoded information bits about to leave at the previous moment are 0, the $I_{n-L}^{c1}$ or $I_{n-L}^{c2}$ in the above equation takes the value −1.

Understandably, the modulation index of LE2S ranges from 0.45 to 0.55, in one specific implementation, for ease of calculation, the first modulation index may take the value of ½, the initial accumulated phase is taken as 0, and the value of the sequence $I_{n-L}^{c1}$, $I_{n-1}^{c2}$ encoded information bits about to leave at the previous moment may be 0 or 1, then after accumulation, all possible values of $\theta_{n+1}^{state}$ are 0, π/2, π, 3π/2, a total of 4, and due to the parity nature of the phase accumulation, it can be simplified to 0, π/2, a total of 2 fixed accumulated phases.

And for LE8S, the sequence of encoded information bits that is about to leave the previous moment of the above equation is the sequence of 8 information bits after the spread spectrum encoding, 1100 is 0 after operation and 0011 is still 0 after operation, therefore, for LE8S, its fixed accumulated phase is always the fixed accumulated phase of the previous moment, which is always the initial phase as can be seen by step-by-step iterations, and if the custom initial phase is 0, then the fixed accumulated phase is always 0.

And the first predetermined number needs to be the same as the memory depth of the encoding, For LE2S and LE8S, the memory depth of the encoding used for convolutional encoding is 3, so the first predetermined number is 3 as well.

For LE2S, the first predetermined number is 3, the number of states will be determined by 3 information bits and 2 fixed accumulated phases, and since each information bit can take the value of 0 or 1, the number of states brought by 3 information bits will be 2×2×2=8, and when the influence of 2 fixed accumulated phases is added, the number of states will be 8×2=16, for example, if the specific state is expressed as a state variable $S_n$, there can be $S_n=(\pi/2, 0, 0, 0)$, $S_n=(0, 0, 0, 1)$, $S_n=(\pi/2, 0, 1, 1)$, and so on for a total of 16.

For LE8S, the first predetermined number is 3, the number of states will be determined by 3 information bits and 1 fixed accumulated phase, and since each information bit can take the value of 0 or 1, the number of states brought by 3 information bits will be 2×2×2=8, and considering that the fixed accumulated phase is a fixed value and can be removed from the state variables, the number of states becomes 8, for example, if the specific state is expressed as a state variable $S_n$, there can be $S_n=(0, 0, 0)$, $S_n=(0, 0, 1)$, $S_n=(0, 1, 1)$, and so on for a total of 8.

It should be noted that the first modulation index is a rational number within a range of modulation indices, so that the number of states can be limited. The value of the first modulation index can ensure that the encoded signal demodulation method provided by the embodiment of the present disclosure using the Viterbi algorithm has a small amount of operations to ensure the implementation of the encoded signal demodulation method.

After determining each state, further obtaining a phase-free information waveform for each state at the current moment, it is understood that the phase-free information waveform at the current moment is the phase-free information waveform for the period from the previous moment before the current moment to the current moment.

Since for devices, the received signal is the encoded signal, to facilitate the subsequent comparison of the local ideal signal with the decoded information and to calculate the difference between the two, the calculation of the local ideal signal can be based on the encoded information bits corresponding to the different information bits before encoding, so that the phase-free information waveform can be obtained based on the encoded information bits, while the phase-free information waveform of the current moment will be influenced by the phase-free information waveform before the current moment, so in order to obtain the phase-free information waveform of the current moment, a second predetermined number of encoded information bits before the current moment, a second modulation index, and encoded information bits after the current moment can first be selected to form each phase-free information waveforms with longer time span corresponding to the second predetermined number of encoded information bits before the current moment and the encoded information bits after the current moment, then the phase-free information waveform corresponding to the encoded information bits of the current moment is intercepted, i.e., the phase-free information waveform of each state at the current moment can be obtained.

Of course, according to encoding rules, if the memory depth of the encoding is 3, i.e., the acquisition of the encoded information bits of the current moment is based on the 3 information bits before encoding before the current moment and the information bits before encoding of the current moment, then the same number of information bits as the memory depth of encoding can be selected when constructing the phase-free information waveform, and the number of encoded information bits (the second predetermined number) can be obtained based on encoding rules, for example: according to the code rate of ½, the number of encoded information bits can be 6, then, the phase-free information waveform can be obtained based on the 6 encoded information bits before the current moment and the 2 encoded information bits at the current moment.

However, as the number of coded information bits used in obtaining the phase-free information waveform increases, the number of phase-free information waveforms obtained increases, and the selection is more complicated, therefore, in another specific embodiment, the number of encoding information bits before encoding corresponding to the second predetermined number of encoded information bits may differ from the memory depth of encoding rules, for example:

For LE2S and LE8S, according to the aforementioned encoding rules, 1 information bit at the current moment will get 2 information bits after encoding, so the encoded information bits at the current moment are 2 information bits, in one specific embodiment, for LE2S, the second predetermined number may be 2, which corresponds to 1 information bit before encoding, and for LE8S, the second predetermined number may be 1, which is 4 after spread spectrum.

In addition, the second modulation index can be any value in the range of modulation indices, for example, for LE, the second modulation index can be any value from 0.45 to 0.55.

In order to simplify the operation and avoid the possible errors caused by the use of different modulation indices in demodulation, the second modulation index can be selected as the first modulation index.

In another embodiment, in order to take into account the devices within the modulation index range and improve the demodulation performance, the second modulation index may also be an endpoint performance balancing value modulation index, so that the performance at the endpoints of the modulation index range can be taken into account, the endpoint performance balancing value modulation index is usually the value in the middle region of the modulation index range, which may be close to one of the endpoints.

In order to improve the demodulation accuracy, the modulation index can also be estimated based on the signal head of the signal to be demodulated to obtain an estimated modulation index, and the second modulation index can be the estimated modulation index.

Further, to improve the demodulation speed, it is specifically possible to traverse the second predetermined number plus 2 number of encoded information bits in advance to obtain each phase-free information waveform for each longer interval, and then intercept the waveform corresponding to the current moment to obtain each phase-free information waveform for the current moment to form a phase-free information waveform table, when specifically demodulating, it is sufficient to look up only the second predetermined number of encoded information bits before the current moment for the specific state jumping, and the value of the encoded information bits taken at the current moment.

Of course, since the modulation index is a range, considering that one of the modulation indices may be selected for demodulation in practice, each phase-free information waveforms corresponding to multiple modulation indices can be obtained and stored in advance, and the waveforms can also be corrected accordingly based on the deviation of the modulation index.

Figure 2:
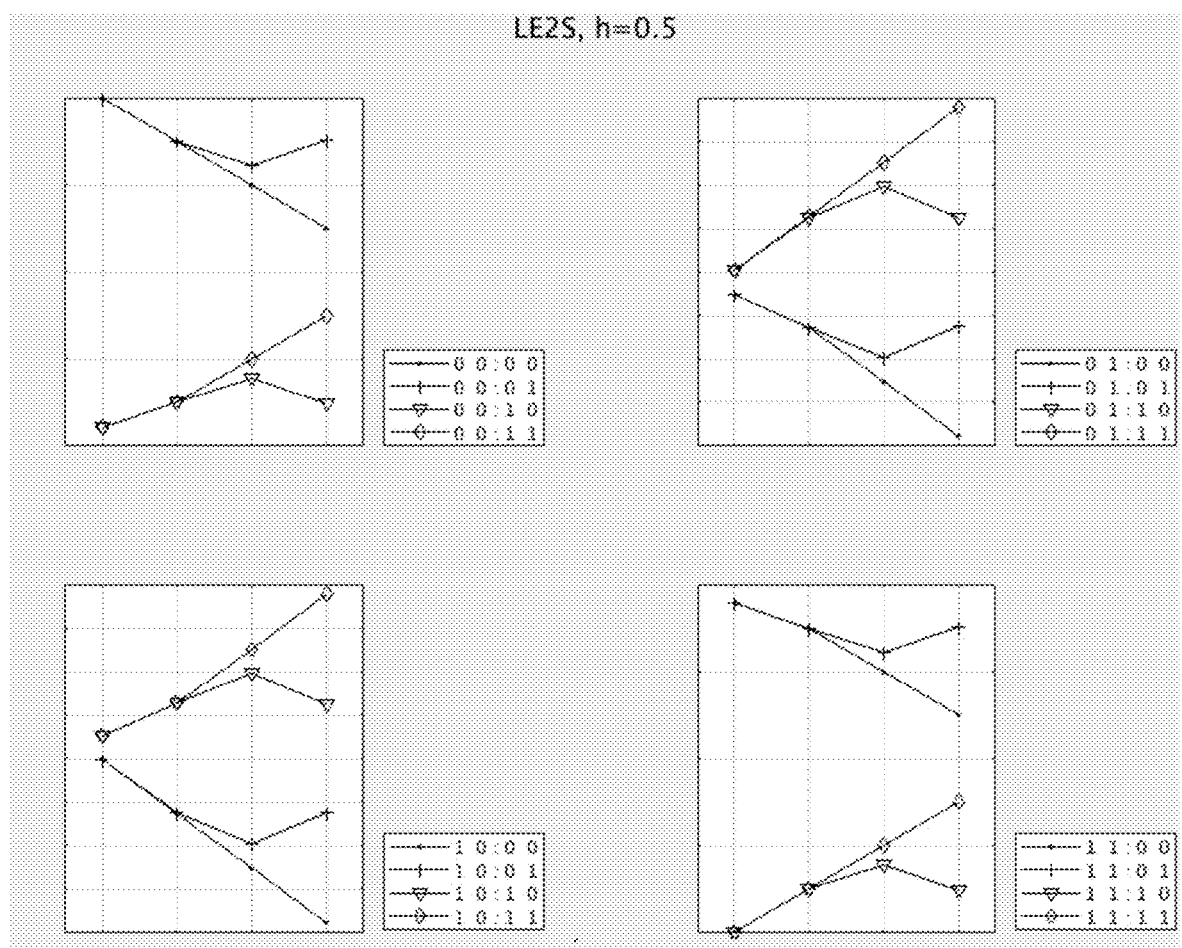
FIG. 2 is a schematic diagram of a phase-free information waveform for each state at the current moment of the encoded signal demodulation method provided by an embodiment of the present disclosure.

Specifically, please refer to FIG. 2, FIG. 2 is a schematic diagram of a phase-free information waveform for each state at the current moment of the encoded signal demodulation method provided by an embodiment of the present disclosure.

Figure 3:
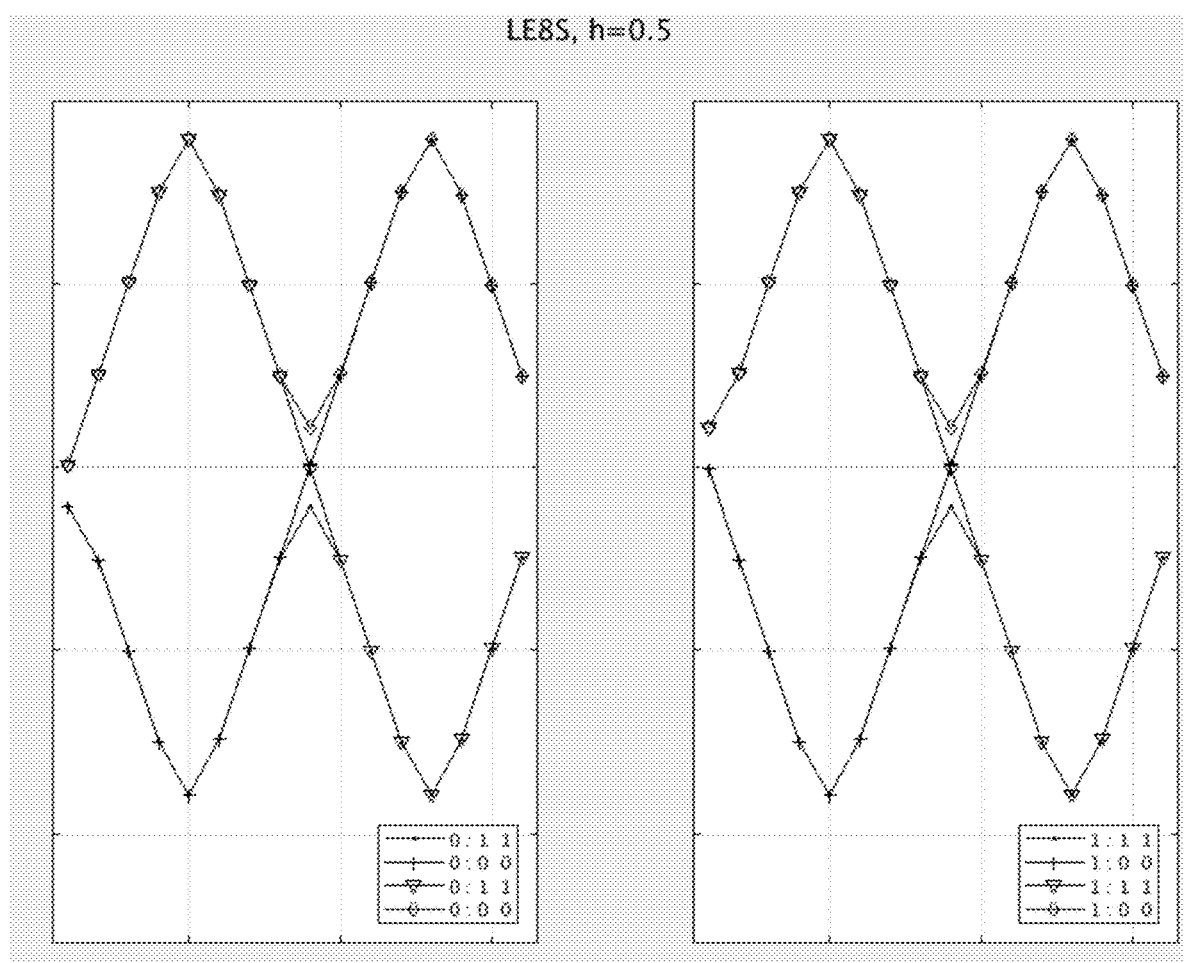
FIG. 3 is another schematic diagram of a phase-free information waveform for each state at the current moment of the encoded signal demodulation method provided by an embodiment of the present disclosure.

The figure shows the phase-free information waveform for each state of Bluetooth LE2S, assuming a second predetermined number of 2, a selected second modulation index of a, and a sampling rate of x, which is based not only on the 2 encoded information bits before the current moment, but also on the 2 possible encoded information bits at the current moment, thus generating a total of 16 phase-free information waveforms, of course, the figure shows that 16 phase-free information waveforms formed using 4 information bits are obtained, and each phase-free information waveform of the current moment obtained after interception is selected based on the first 2 information bits before the current moment after encoding and the 2 information bits of the current moment after encoding together when making the selection Please refer to FIG. 3, FIG. 3 is another schematic diagram of a phase-free information waveform for each state at the current moment of the encoded signal demodulation method provided by an embodiment of the present disclosure.

As shown in FIG. 3, the phase-free information waveform for each state of Bluetooth LE8S is shown, assuming a second predetermined number of 1 (the second predetermined number here is the number of information bits after convolutional encoding, because spread spectrum coding only increases the number of encoded information bits, there is no increase in the encoded information that can be put into the phase-free waveform table), a selected second modulation index of a, and a sampling rate of x, which is based not only on 1 encoded information bit before the current moment, but also on 2 possible encoded information bits at the current moment, thus generating a total of 8 phase-free information waveforms, similar to the description of LE2S, shown in the figure to obtain 8 phase-free information waveforms formed using 3 encoded information bits, and after interception to obtain each phase-free information waveform at the current moment, when making the selection, the first 1 information bit of the current moment after encoding (4 information bits after spread spectrum encoding) and the 2 information bits of the current moment after encoding (8 information bits after spread spectrum encoding) are jointly selected.

In order to obtain the local ideal signal, in addition to obtaining the phase-free information waveform of each state, it is also necessary to obtain the practical accumulated phase of each state, which corresponds to each state at the current moment. For LE8S, due to the special nature of the spread spectrum coding (as described earlier), when the initial practical accumulated phase is selected to be 0, the practical accumulated phase is always 0 and is not required to be calculated; the following describes the calculation method of LE2S.

Specifically, the practical accumulated phase is obtained based on the second modulation index, the practical accumulated phase of the previous moment and each encoded information bits of the previous moment.

It can be understood that for the practical accumulated phase of the first moment, i.e. the initial practical accumulated phase can be determined in a custom way.

As before, the second modulation index can be any value in the range of modulation indices, and the second modulation index used in obtaining the practical accumulated phase is the same as the second modulation index for phase-free information waveform.

The practical accumulated phase can be obtained by the following formula:

$$\theta_{n+1}^{use} = R_{2\pi}[\theta_n^{use} + \pi h_{use}(I_{n-L_c}^{c1} + I_{n-L_c}^{c2})]$$

wherein: $\theta_{n+1}^{state}$ represents the fixed accumulated phase at the current moment;

$\theta_n^{state}$ represents the fixed accumulated phase of the previous moment;

$h_{state}$ represents the first modulation index;

$I_{n-1}^{c1}$, $I_{n-L}^{c2}$ represent the sequence of encoded information bits about to leave at the previous moment;

$R_{2\pi}[*]$ represents taking the remainder of the angle value in [ ].

It is easy to understand that, as in the calculation of the fixed cumulative phase, in the calculation of the actual cumulative phase, the information bits after encoding that are about to leave at the previous moment are shifted down by one $\pi h_{use}$ if they are 0, therefore, when the encoded information bit about to leave at the previous moment is 0, the $I_{n-L}^{c3}$ or $I_{n-L}^{c2}$ in the above equation takes the value −1.

It can be understood that when the second modulation index is equal to the first modulation index, the practical accumulated phase is equal to the fixed accumulated phase, thus the amount of operations can be reduced.

And when the practical accumulated phase is different from the fixed accumulated phase, i.e., the second modulation index is different from the first modulation index, so that the practical accumulated phase is separated from the fixed accumulated phase, either the endpoint performance balancing value modulation index or the estimated modulation index can be chosen as the second modulation index, in this way, on the one hand, the number of states can be reduced by using the first modulation index to determine the states, and on the other hand, the error due to the endpoints of the first modulation index deviating from the modulation index range can be reduced.

After obtaining the practical accumulated phase and phase-free information waveforms, further obtaining the local ideal signal corresponding to each state at the current moment.

Specifically, the local ideal signal can be obtained by the following formula:

$$W(k) = w(k)e^{j\theta^{use}}$$

wherein: W(k) represents the kth sample point of the local ideal signal at the current moment;

w(k) represents the kth sample point of the phase-free information waveform at the current moment;

$\theta^{use}$ represents the practical accumulated phase;

j represents imaginary unit.

As before, when the first predetermined number is 3 and the first modulation index is ½, the number of states is 16, and combined with the information bits of the current moment, the obtained local ideal signals are 32.

Since the first modulation index is different from the second modulation index, in corresponding the specific local ideal signal to the state, the correspondence is based on the encoded bit information during the signal transmission.

Step S11: obtaining a branch metric for each branch path at the current moment based on each local ideal signal and a received signal corresponding to the local ideal signal.

After obtaining the local ideal signal, further obtaining the branch metric of the two based on a received signal. The received signal is of course the signal corresponding to the time of the local ideal signal.

Specifically, the branch metric is obtained by the following formula:

$$BM_n = \langle W(k), R(k) \rangle$$
$$= \sum_{k=1}^{N_{spb}} W(k)R(k)$$

wherein: $BM_n$ represents the branch metric for the current moment;

W(k) represents the kth sample point of the local ideal signal at the current moment;

R(k) represents the kth sample point of the received signal at the current moment;

$N_{spb}$ represents the number of samples corresponding to each information bit.

That is, when obtaining the branch metric using the local ideal signal and the received signal, specifically, obtaining the branch metric using the kth sample point of the local ideal signal at the current moment and the kth sample point of the received signal at the current moment.

It is easy to understand that the branch path in this paper is the path that jumps from a state at the previous moment to a state at the current moment, and the branch metric is the similarity between the state jumping signal of the branch path and the received signal.

It is understood that the kth sample point of the local ideal signal at the current moment and the kth sample point of the received signal at the current moment correspond to each sample points of the encoded information bits.

Of course, the obtained branch metric can directly correspond to the information bits before encoding, thus it can also be understood as the branch metric of the information bits before encoding, so that the information bits before encoding can be directly obtained after the subsequent operation.

Step S12: obtaining each modulation index error correction path metric for the current moment based on the branch metric for each state at the current moment, and at least one of a survivor path metric for a survivor path of the previous moment and a third predetermined number of surviving branch metrics for the survivor path of the previous moment.

After obtaining the branch metric at the current moment, further obtaining the modulation index error correction path metric.

It should be noted that the modulation index error correction path metric in this embodiment refers to the corrected path metric that takes into account the error caused by the modulation index, and the path metric that takes into account the error but is not processed.

It is easy to understand that the branch metric of the current moment is the branch metric of each branch path from the previous moment to the time corresponding to the current moment, each modulation index error correction path metric for the current moment is the modulation index error correction path metric from a moment to the corresponding time of the current moment.

Wherein the correspondence between the branch metric of each state at the current moment and one of the survivor path metric of the survivor paths of the previous moment or the second predetermined number of surviving branch metrics is determined based on the state jumping rules.

Specifically, when jumping from the nth moment to the (n+1)th moment, each state at the nth moment is denoted by $S_n$ and each state at the (n+1)th moment is denoted by $S_{n+1}$, and the state jumping rule can be:

$$S_n \rightarrow S_{n+1},$$

that is: $(\theta_n^{state}, I_{n-Lc}, I_{n+Lc}, \ldots, I_{n-1}) \rightarrow (\theta_{n+1}^{state}, I_{n-Lc+1}, I_{n-Lc+2}, \ldots, I_n)$ Wherein, $I_n$ represents new incoming signal bits of new state before encoding;

$I_{n-Lc}$ represents the signal bits of the old states about to leave before encoding;

$\theta_n^{state}$ represents the fixed accumulated phase of the old state;

$\theta_{n+1}^{state}$ represents the fixed accumulated phase of the new state.

For the purpose of illustrating the status jumps, the following examples are given:

For a state at the nth moment, denoted as (0, 1, 0, 0, 1), which may become one of the states at the n+1th moment after a state jump, can be denoted as (π/2, 0, 0, 0, 1), then the path connecting the state at the nth moment (0, 1, 0, 0) with the state at the n+1th moment (π/2, 0, 0, 1) is the branch path, and the preferred path before reaching the state (0, 1, 0, 0) at the nth moment is the survivor path to the state (0, 1, 0, 0, 1) at the nth moment, i.e., the survivor path of the previous moment.

Then for a state at the n+1th moment, it is always possible to find a jump from a certain two states at the nth moment. In turn, it is possible to obtain the survivor paths and two branch paths of the two states at the nth moment corresponding to a state at the n+1th moment.

In turn, for each state at the n+1th moment, it is possible to find the respective states that correspond to them before the jump and obtain the survivor paths of each state, as well as to realize the path continuation relationship between the branch path at the current moment and the survivor path at the previous moment.

Based on the state jumping rules, two states at the previous moment will jump to the same state at the current moment along their respective paths, i.e. two branch paths correspond to one state.

Figure 4:
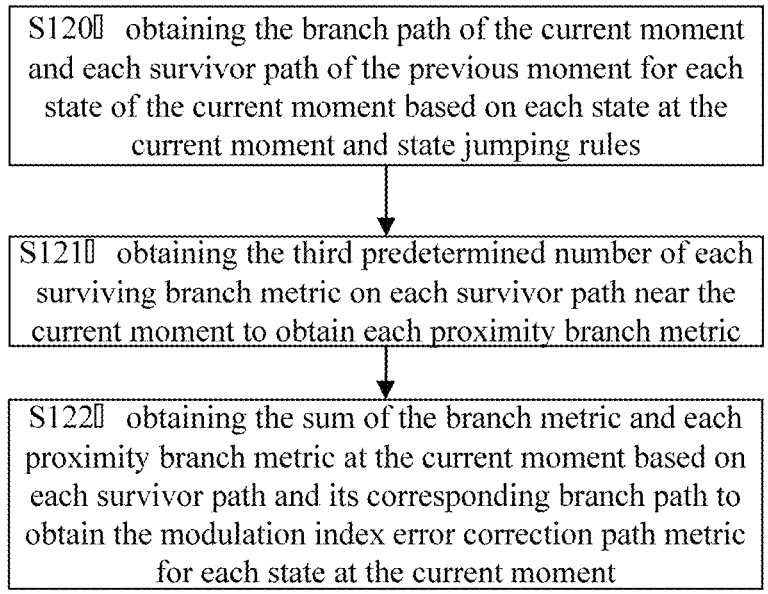
FIG. 4 is a flow diagram of obtaining the modulation index error correction path metric for the encoded signal demodulation method provided by the embodiment of the present disclosure.

In one specific embodiment, referring to FIG. 4, FIG. 4 is a flow diagram of obtaining the modulation index error correction path metric for the encoded signal demodulation method provided by the embodiment of the present disclosure.

Step S120: obtaining the branch path of the current moment and each survivor path of the previous moment for each state of the current moment based on each state at the current moment and state jumping rules.

Combining each state of the current moment and the state jumping rules to obtain the branch path corresponding to each state of the current moment, i.e., the path of jumping from a state of the previous moment to a state of the current moment, and each survivor path of the previous moment.

Specifically, the path continuation relationship between the branch path of the current moment and the survivor path of the previous moment is realized based on the aforementioned state jumping rules, which will not be repeated here.

Step S121: obtaining the third predetermined number of each surviving branch metric on each survivor path near the current moment to obtain each proximity branch metric.

Then obtaining the third predetermined number of each surviving branch metric along each survivor path in turn, and of course, the third predetermined number means that the second predetermined number of surviving branch metrics needs to be obtained on each survivor path, and is referred to as the proximity branch metric.

Step S122: obtaining the sum of the branch metric and each proximity branch metric at the current moment based on each survivor path and its corresponding branch path to obtain the modulation index error correction path metric for each state at the current moment.

Then, based on the survivor path, obtaining the sum of each proximity branch metric to the nth moment, and based on the state jumping rules, obtaining the branch paths that continue to extend along each survivor path to jump from the state at the nth moment to the state at the n+1th moment, and then the branch metric corresponding to each branch path is obtained, and the branch metric is added to obtain the modulation index error correction path metric for each state at the n+1th moment.

Specifically, the modulation index error correction path metric for any of the states can be obtained by the following formula:

$$PM_n = \sum_{k=n-lseg+1}^{n-1} BM_k + BM_n$$

wherein: $PM_n$ represents the modulation index error correction path metric at the current moment;

$l_{seg}$ represents the third predetermined number;

$BM_k$ represents the branch metric corresponding to moment k in the proximity branch metric;

$BM_n$ represents the branch metric for the current moment (the nth moment).

Of course, the survivor paths corresponding to each proximity branch metric in the above formula have a state jumping path extension relationship at different moments from the branch metric at the current moment, for any state of the current moment, obtaining the modulation index error correction path metric of the current moment based on the above formula, and then the modulation index error correction path metric of the current moment can be obtained for each state, and there are two modulation index error correction path metrics for each state of the current moment.

It can be seen that when obtaining the modulation index error correction path metric, only each surviving branch metric near the current moment and the branch metric at the current moment are used to obtain the modulation index error correction path metric for each state, thus, the deviation between the local ideal signal and the received signal at the early stage due to time extension can be reduced, and the accuracy of the modulation index error correction path metric can be improved, thus achieving improved demodulation performance.

Figure 5:
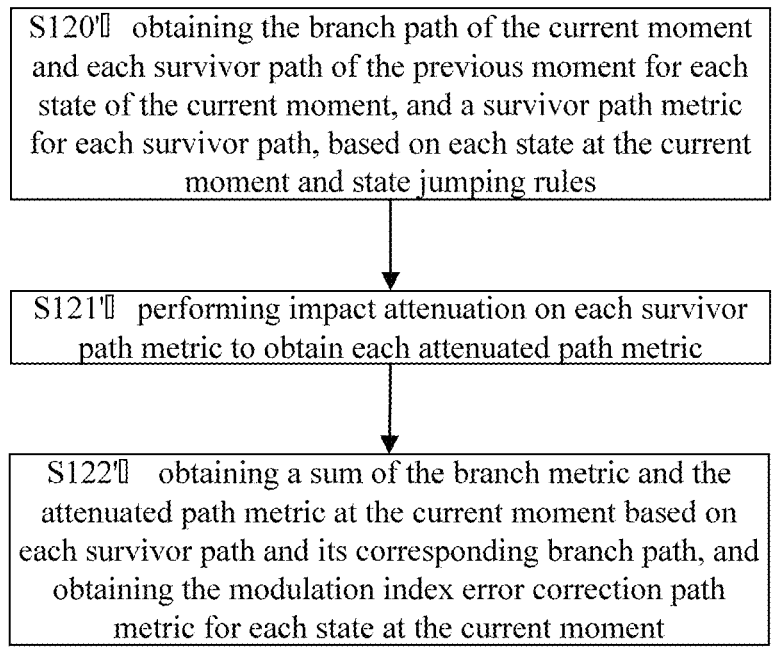
FIG. 5 is another flow diagram of obtaining the modulation index error correction path metric for the encoded signal demodulation method provided by the embodiment of the present disclosure.

In another specific implementation, please refer to FIG. 5, FIG. 5 is another flow diagram of obtaining the modulation index error correction path metric of the encoded signal demodulation method provided by the embodiment of the present disclosure.

As shown in the figure, the encoded signal demodulation method provided by the embodiment of the present disclosure, in order to obtain the modulation index error correction path metric, comprises the following steps:

Step S120': obtaining the branch path of the current moment and each survivor path of the previous moment for each state of the current moment, and a survivor path metric for each survivor path, based on each state at the current moment and state jumping rules.

Please refer to the description of step S120 shown in FIG. 4 for the specific way to obtain each survivor path and branch path, which will not be repeated here.

Once the survivor path is obtained, the corresponding survivor path metric can be obtained based on the survivor path.

It is easy to understand that the survivor path metric is obtained based on the acquisition, comparison and selection of the modulation index error correction path metric at the previous moment, which can be stored after it is obtained in the previous moment for the convenience of the later moment.

Step S121': performing impact attenuation on each survivor path metric to obtain each attenuated path metric.

After obtaining the survivor path metric, in order to reduce the error impact of the survivor path metric of the previous moment on the modulation index error correction path metric of the current moment, it can be attenuated to obtain each attenuated path metric.

Specifically, each attenuated path metric can be obtained by multiplying the survivor path metric by an attenuation factor of less than 1.

In one specific implementation, for ease of hardware implementation, the attenuation factor can be obtained by the following formula:

$$\eta = 1 - \frac{1}{2^m}$$

wherein: $\eta$ represents attenuation factor;
m represents positive integer.

m can be any positive integer, such as 1, 2, 3, etc. The above formula to obtain the attenuation factor simplifies the logic of obtaining the attenuation factor, and also reduces the amount of calculation when obtaining the modulation index error correction path metric.

Step S122': obtaining a sum of the branch metric and the attenuated path metric at the current moment based on each survivor path and its corresponding branch path, and obtaining the modulation index error correction path metric for each state at the current moment.

For a state at the current moment, combining the survivor paths and state jumping rules to obtain each branch path to a state and each survivor path before the state jumping, then the attenuated path metric of the survivor paths corresponding to the mutual continuation is added with the branch metric of each branch path to obtain the modulation index error correction path metric of a state at the current moment, until the modulation index error correction path metric of all states at the current moment is obtained.

Specifically, the modulation index error correction path metric is obtained by the following formula:

$$PM_n = \eta \cdot PM_{n-1} + BM_n$$

wherein: $PM_n$ represents the modulation index error correction path metric at the current moment;
$PM_{n-1}$ represents the survivor path metric for survivor paths at the previous moment;
$\eta$ represents attenuation factor;
$BM_n$ represents the branch metric for the current moment.

It is easy to understand that the above formula is applicable to the acquisition of the modulation index error correction path metric for each state at the current moment, but there is a path extension correspondence between the survivor path corresponding to the survivor path metric of the survivor path at the previous moment and the branch path corresponding to the branch metric at the current moment.

For any state of the current moment, obtaining the modulation index error correction path metric of the current moment based on the above formula, and then the modulation index error correction path metric of the current moment can be obtained for each state, and there are two modulation index error correction path metrics for each state of the current moment.

It can be seen that when obtaining the modulation index error correction path metric, multiplying the survivor path metric by an attenuation factor of less than 1 can reduce the deviation between the early local ideal signal and the received signal from accumulating and becoming larger due to the time extension, and improve the accuracy of the modulation index error correction path metric, thus achieving improved demodulation performance, moreover, when obtaining the modulation index error correction path metric, only the survivor path metric of the previous moment and the branch metric of the current the nth moment need to be obtained, and the operation process is relatively simple.

Figure 6:
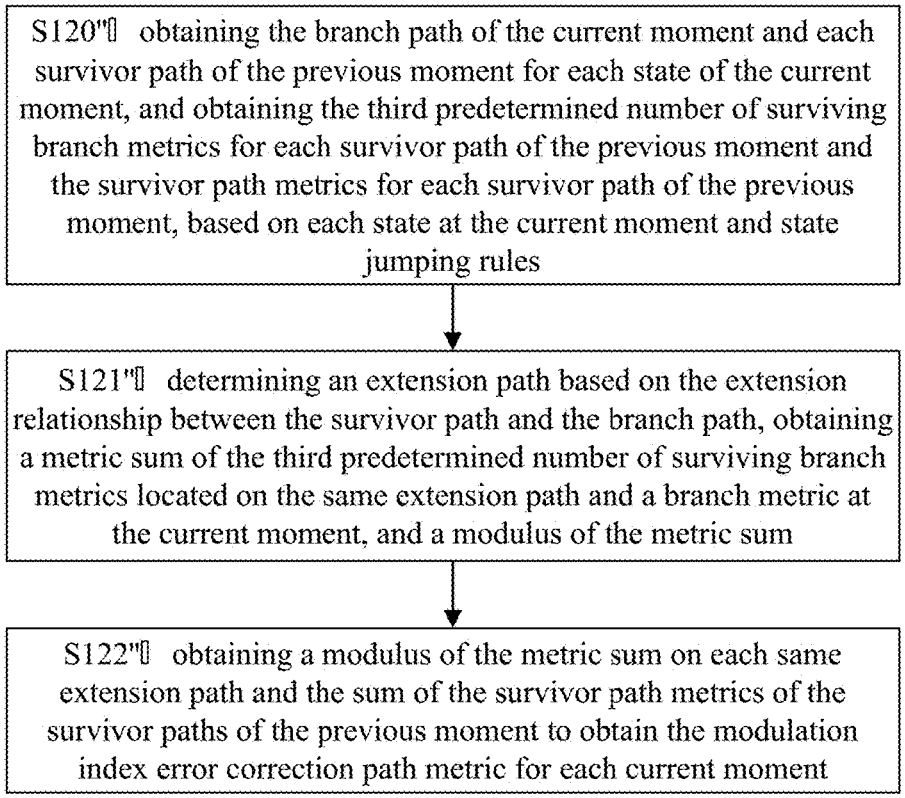
FIG. 6 is another flow diagram of obtaining the modulation index error correction path metric for the encoded signal demodulation method provided by the embodiment of the present disclosure.

In another specific embodiment, referring to FIG. 6, FIG. 6 is another flow diagram of obtaining the modulation index error correction path metric of the encoded signal demodulation method provided by the embodiment of the present disclosure.

As shown in the figure, the encoded signal demodulation method provided by the embodiment of the present disclosure, in order to obtain the modulation index error correction path metric, comprises the following steps:

Step S120": obtaining the branch path of the current moment and each survivor path of the previous moment for each state of the current moment, and obtaining the third predetermined number of surviving branch metrics for each survivor path of the previous moment and the survivor path metrics for each survivor path of the previous moment, based on each state at the current moment and state jumping rules.

Please refer to the description of step S120 shown in FIG. 4 for the specific way to obtain each survivor path and branch path, which will not be repeated here.

After obtaining the survivor paths, further along each survivor path, obtaining the third predetermined number of surviving branch metrics and survivor path metrics for each survivor path.

Step S121": determining an extension path based on the extension relationship between the survivor path and the branch path, obtaining a metric sum of the third predetermined number of surviving branch metrics located on the same extension path and a branch metric at the current moment, and a modulus of the metric sum.

Then the survivor paths of the previous moment with extension relationship and the branch paths of the current moment are determined as extension paths, and each extension path is obtained.

Obtaining a metric sum of a third predetermined number of surviving branch metrics and a branch metric at the current moment located on the same extension path and a modulus of the metric sum, further, obtaining a metric sum of the third predetermined number of surviving branch metrics located on the same extension path and a branch metric at the current moment, and thereby obtaining the modulus of the metric sum.

Specifically, the modulus of the metric sum is obtained by the following formula:

$$temp_n = \left| \sum_{k=n-lseg+1}^{n} BM_k \right|$$

wherein: $temp_n$ represents the modulus of the metric sum;
$BM_k$ represents the branch metric corresponding to moment k;
lseg represents the third predetermined number.

In another specific embodiment, the modulus of the metric sum can also be obtained by the following formula:

$$temp_n = \left| \sum_{k=n-lseg+1}^{n} BM_k \right|^2$$

wherein: $temp_n$ represents the modulus of the metric sum;
$BM_k$ represents the branch metric corresponding to moment k;
lseg represents the third predetermined number.

Step S122": obtaining a modulus of the metric sum on each same extension path and the sum of the survivor path metrics of the survivor paths of the previous moment to obtain the modulation index error correction path metric for each current moment.

After obtaining each modulus of the metric sum, further obtaining each modulation index error correction path metric.

Specifically, the modulation index error correction path metric can be obtained by the following formula:

$$PM_n = PM_{n-1} + temp_n$$

wherein: $PM_n$ represents the modulation index error correction path metric at the current moment;
$PM_{n-1}$ represents the survivor path metric for survivor paths at the previous moment;
$temp_n$ represents the modulus of the metric sum.

In this way, when obtaining the modulation index error correction path metric, the modulation index error correction path metric is further calculated by using the modulus of the metric sum, which can reduce the situation that the deviation between the local ideal signal and the received signal at the early stage becomes larger and larger due to the accumulation of time, and improve the accuracy of the modulation index error correction path metric, thus achieving improved demodulation performance.

Step S13: comparing modulus of each modulation index error correction path metric into the same state, and obtaining the survivor path metric, survivor paths and information bits before encoding for each state at the current moment that satisfies the requirements.

After obtaining each modulation index error correction path metric, comparing each modulation index error correction path metric entering (jumping to) the same state at the current moment, and obtaining the survivor path metric, survivor paths and information bits before encoding for each state at the current moment that satisfies the requirements.

In one specific implementation, the largest modulation index error correction path metric among the various modulation index error correction path metrics that jump to the same state at the current moment can be selected, specifically, the survivor path, the survivor path metric, and the information bits before encoding can be determined based on the output of the comparison judgment being 0 or 1. For example, if the modulus of the modulation index error correction path metric of path A is greater than the modal value of the modulation index error correction path metric of path B, the output is 0, otherwise the output is 1, then when 0 is received, it is determined that path A is the survivor path, the modulation index error correction path metric of path A is the survivor path metric, and the information bits before encoding of the current moment of path A are the information bits before encoding that are determined to be acquired by this state.

It is easy to understand that the branch paths that jump from the previous moment to the same state of the current moment are two, and after comparison, the branch path that meets the requirements is superimposed on the survivor path of the previous moment as the survivor path.

In order to facilitate the determination of the survivor path at the next moment and the execution of the subsequent steps, in a specific implementation, after obtaining the survivor path at the current moment, at least one of the surviving branch metric corresponding to the survivor path of each state at the current moment and the survivor path metric of each state at the current moment can also be recorded so that it can be easily obtained at the next moment.

Of course, depending on how the modulation index error correction path metric is obtained, one can choose to record the surviving branch metric for each state at the current moment or the survivor path metric for each state at the current moment, or both. Of course, it is easy to understand that when using the surviving branch metric to obtain the modulation index error correction path metric, at least the surviving branch metric of each state at the current moment needs to be recorded; when using the survivor path metric to obtain the modulation index error correction path metric, that is, the surviving branch metric of each state at the current moment can be recorded, and the survivor path metric of each state at the current moment can also be recorded, but the latter can reduce the amount of operations and improve the efficiency of demodulation.

Step S14: determining whether the received signal is an ending signal, if yes, performing step S18, if not, performing step S15 and step S16.

After obtaining the survivor path and the information bits of the current moment, determining whether the received signal is the ending information, and if it is not the ending signal, the subsequent signal processing is required, then execute step S15 and step S16 to determine whether the backtracking requirement is satisfied, and jump to the next state; if it is the ending information, it means that all the signals in the current signal packet have been sent, so the next moment signal processing is not required, only the signal of the survivor path is needed to be output, that is, step S18 is executed.

Step S15: jumping to each states at the next moment, and taking the next moment as the new current moment, performing step S10.

Of course, the state jumping rules can be referred to the aforementioned description of the state jumping rules, which will not repeat them here.

Step S16: determining whether a backtracking predetermined requirement is reached, if yes, performing step S17.

If the predetermined backtracking requirement is met, performing backtracking, step S17 is executed.

In a specific implementation, the predetermined backtracking requirement may be a predetermined backtracking depth, for example, the backtracking depth is set to 10, and when the received signal is the information bits of the first moment, since the predetermined backtracking requirement is not satisfied, step S17 is not executed, and only step S15 is executed, and when the received signal is the information bit of the 11th moment, the backtracking is performed based on the backtracking depth of 10, and it is known that the backtracking requirement has been satisfied, then performing step S17.

Of course, in other implementations, other backtracking requirements can be set, and when the predetermined backtracking requirements are met, performing step S17.

Step S17: backtracking any of the survivor paths of each state at the current moment, and outputting the information bits before encoding corresponding to a backtracking moment.

When a predetermined backtracking requirement is reached, any of the survivor paths of each state at the current moment is selected and backtracked, and then outputting the information bits before encoding corresponding to the backtracking moment.

It is understood that the corresponding backtracking moment described herein refers to the backtracking moment corresponding to the current moment according to the predetermined backtracking requirement.

For example, when the received signal is the information bits of the 11th moment, and the backtracking is performed based on the backtracking depth of 10, the corresponding backtracking moment is the 1st moment, i.e., the information bits of the 1st moment are output, and when the received signal is the information bits of the 12th moment, the backtracking is performed based on the backtracking depth of 10, the corresponding backtracking moment is the 2nd moment, and the information bits of the 2nd moment are output.

If the signal in the signal package has other signals to assist in demodulation after the signal that also contains specific information, then other signals can be implemented to backtrack and meet the output of the signal with specific information.

Of course, to be consistent with the processing of the tail signal and to facilitate processing, the survivor path with the largest survivor path metric for each state at the current moment can also be selected for backtracking.

In another specific implementation, when the signal in the signal package contains only the signal of specific information, i.e., the ending signal is also required to be demodulated to achieve the acquisition of the signal, but cannot meet the aforementioned backtracking requirements, for this purpose, the backtracking method provided by embodiments of the present disclosure may also comprise:

Step S18: backtracking the survivor path of each state of the current moment with the largest survivor path metric, and outputting a sequence of information bits before encoding after the corresponding backtracking moment to the ending signal.

If the received signal is an ending signal, the output of the received signal cannot be achieved by backtracking, in this case, the survivor path with the largest survivor path metric is obtained by comparing the survivor path metric of each state at the current moment, then obtaining the sequence of information bits before encoding from the signal after the corresponding backtracking moment to the ending signal by backtracking the largest survivor path of the survivor path metric at the current moment, and obtaining the demodulated signal of all signals.

Figure 7:
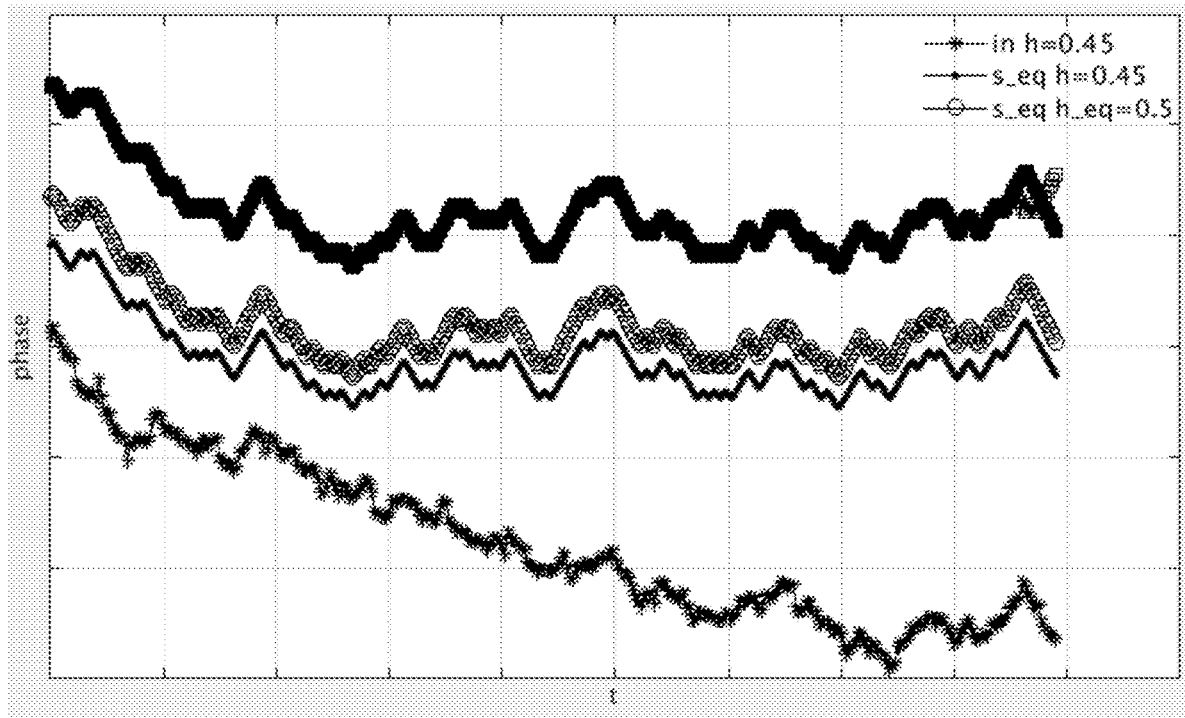
FIG. 7 is a schematic diagram of the candidate path extension of the encoded signal demodulation method provided by embodiments of the present disclosure.

Please refer to FIG. 7, FIG. 7 is a schematic diagram of the candidate path extension of the encoded signal demodulation method provided by embodiments of the present disclosure.

As shown in the figure, the horizontal coordinate is the time t, which indicates the time elapsed, i.e., each moment in the demodulation process, and the vertical coordinate is the phase of the phase information, and each line is the phase in different cases, the * marker line is the phase of the received signal (i.e., the real phase) with its modulation index h=0.45; the ● marker line is the phase of the signal expected to be recovered locally using the modulation index $h_{use}$=0.45 (i.e. with the first modulation index of 0.5, the second modulation index of 0.45 obtained using the encoded signal demodulation method provided by the embodiment of the disclosure), and this signal is only used as a comparison, and the difference between it and the received signal is whether it has been filtered, etc.

Figure 8:
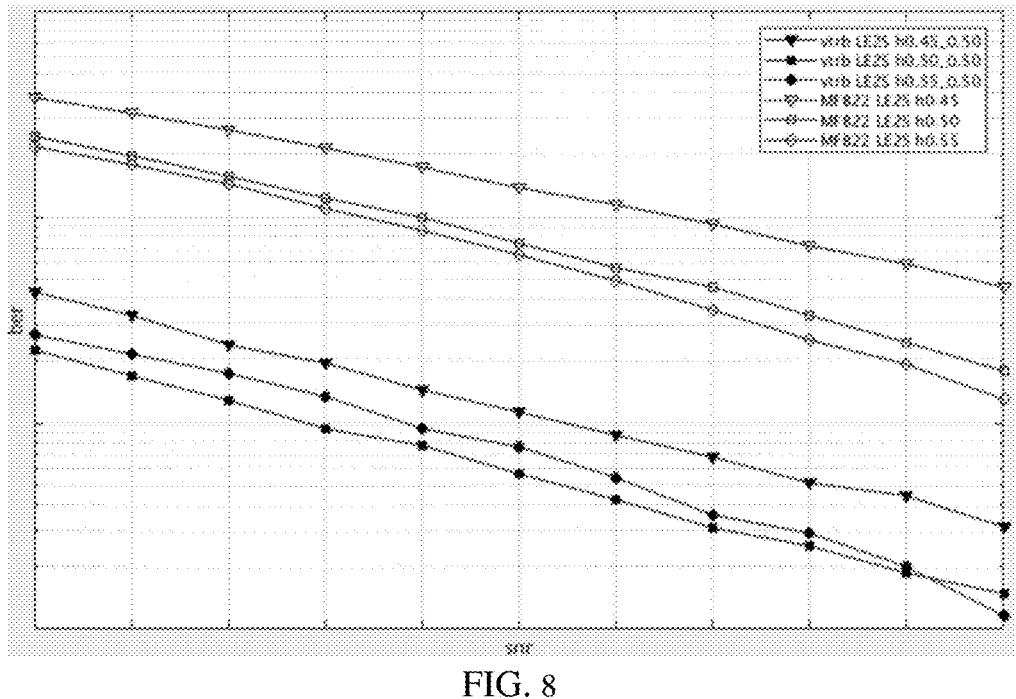
FIG. 8 is a comparison diagram of the demodulation performance of the encoded signal demodulation method and the matched filter bank method provided by embodiments of the present disclosure in a device using LE2S technology.

In FIGS. 7 and 8, the o marker line, the □ marker line and the solid ■ marker line are the phases of the signals expected to be recovered locally using the modulation index $h_{use}$=0.5 (i.e., obtained with the first modulation index of 0.5, the second modulation index of 0.5, obtained by using the encoded signal demodulation method provided by embodiments of the present disclosure), wherein the □ marker line is the candidate path, wherein the solid ■ marker line is the best candidate path.

According to FIG. 7, it can be seen that the waveform variations of the solid ■ marker line and the ● marker line are identical, and it can be seen that when the noise is low, the true modulation index of the received signal h=0.45, and when demodulation is performed using the encoded signal demodulation method provided by the embodiment of the present disclosure, it can still be demodulated correctly even though the modulation index used $h_{use}$=0.5, and it can also be seen that as time goes on, there will be only one survivor path left, and it will be the correct path.

Figure 9:
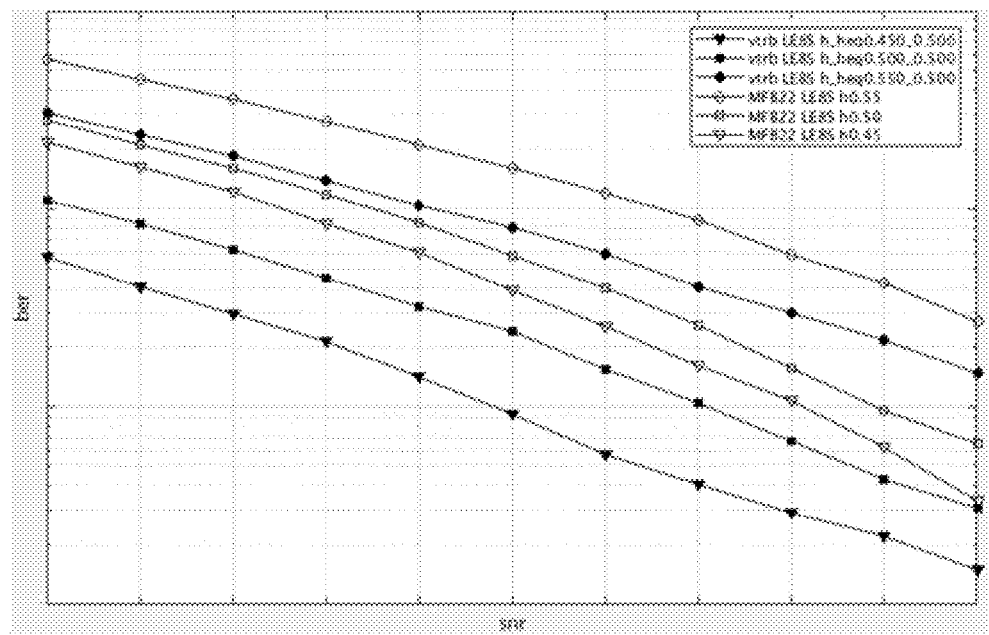
FIG. 9 is a comparison diagram of the false bit rate of the encoded signal demodulation method provided by embodiments of the present disclosure for devices using LE8S technology with different practical modulation indices.

In order to illustrate the performance of the encoded signal demodulation method provided by embodiments of the present disclosure, which is now illustrated by simulated performance graph, please refer to FIGS. 8 and 9, FIG. 8 is a comparison diagram of the demodulation performance of the encoded signal demodulation method and the matched filter bank method provided by embodiments of the present disclosure in a device using LE2S technology, FIG. 9 is a comparison diagram of the false bit rate of the encoded signal demodulation method provided by embodiments of the present disclosure for devices using LE8S technology with different practical modulation indices.

As shown in the figures, the horizontal coordinate is the signal-to-noise ratio, which increases as it goes to the right, and the vertical coordinate is the bit error rate, which increases as it goes up.

As shown in FIG. 8, it can be seen that for devices using LE2S technology, with the same signal-to-noise ratio and the same demodulation modulation index as the modulation index of the received signal, the bit error rates of the encoded signal demodulation method provided by the embodiments of the present disclosure are all smaller than the bit error rates of the matched filter bank methods, which have better performance.

As shown in FIG. 9, it can be seen that for devices using LE8S technology, with the same signal-to-noise ratio and with the same modulation index of the demodulation modulation and the modulation index of the received signal, the error bit rates of the encoded signal demodulation methods provided by embodiments of the present disclosure are all smaller than the error bit rates of the matched filter bank methods, which have better performance.

It can be seen that, the encoded signal demodulation method provided by embodiments of the present disclosure can ensure the feasibility of the modulation method provided by the embodiment of the present disclosure using the Viterbi algorithm by using the rational number falling within the range of modulation indices as the first modulation index on the one hand, and determining each state using the fixed accumulated phase corresponding to the first modulation index, so that the device with modulation index range has a controllable number of states. At the same time, determines the practical accumulated phase based on the second modulation index, the practical accumulated phase of the previous moment and each encoded information bits of the current moment, so that the practical accumulated phase is different from the fixed accumulated phase, which can reduce the large error caused by the first modulation index corresponding to the fixed accumulated phase; Further, to ensure the accuracy of the subsequent survivor path determination and to avoid the accumulation of errors due to the use of the second modulation index and the difference between the second modulation index and the first modulation index, obtains an error correction path metric for each modulation index at the current moment based on one of the current moment branch metric, and the survivor path metric for the survivor paths of the previous moment or the third predetermined number of branch metrics, and determines the survivor path metric, survivor path and information bits before encoding for each state by comparing the modulus of the modulation index error correction path metric to improve the accuracy of the determination of the survivor path metric, survivor path and information bits before encoding. Thereby, the encoded signal demodulation method provided by the embodiments of the present disclosure can reduce the effect of errors caused by the modulation index and improve demodulation performance based on the realization of demodulation of signals from devices with a modulation index range, and meanwhile be able to achieve demodulation for encoding devices.

The encoded signal demodulation apparatus provided by the embodiments of the present disclosure is described below, and the encoded signal demodulation apparatus described below may be considered as, a functional module architecture or hardware device required to be set up by an electronic device (e.g., Bluetooth) to implement the encoded signal demodulation method provided by the embodiments of the present disclosure. The contents of the demodulation apparatus described below can be cross-referenced to the contents of the encoded signal demodulation method described above, respectively.

Figure 10:
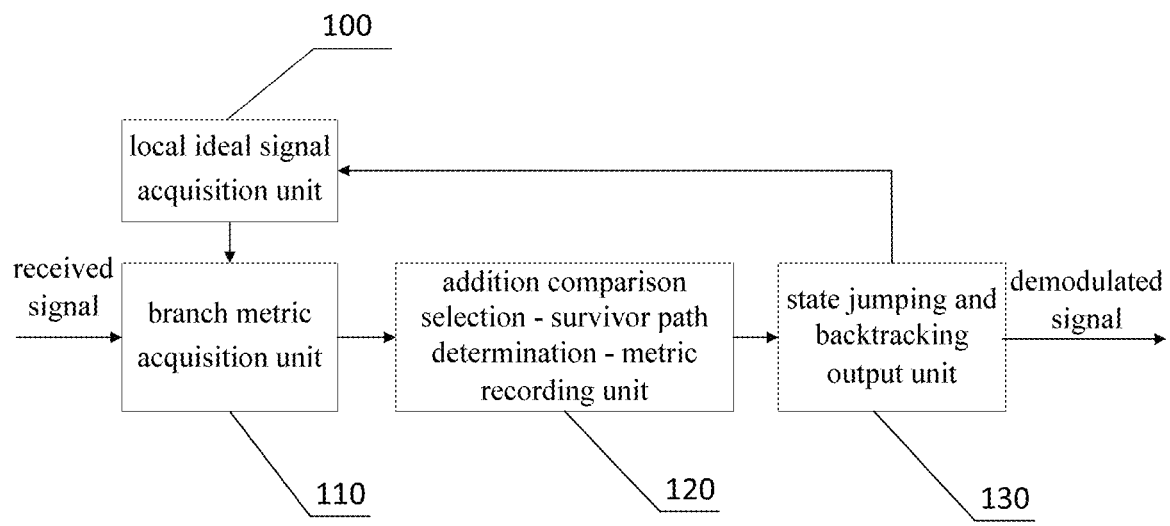
FIG. 10 is a block diagram of an encoded signal demodulation apparatus provided by embodiments of the present disclosure.

FIG. 10 is a block diagram of an encoded signal demodulation apparatus provided by embodiments of the present disclosure, referring to FIG. 10, the encoded signal demodulation apparatus comprises:

a local ideal signal acquisition unit 100, used for obtaining a local ideal signal corresponding to each state at a current moment based on a phase-free information waveform of each state at the current moment and a practical accumulated phase corresponding to each state at the current moment, wherein each state is determined based on a first predetermined number of information bits and each fixed accumulated phase corresponding to a first modulation index, the fixed accumulated phase is obtained based on the first modulation index, the practical accumulated phase of a previous moment and each encoded information bits of the previous moment, the phase-free information waveform at each current moment is obtained based on a second modulation index, a second predetermined number of encoded information bits before the current moment and each encoded information bits of the current moment, the practical accumulated phase of each current moment is obtained based on the second modulation index, the practical accumulated phase of the previous moment and each encoded information bits of the previous moment, the first modulation index is a rational number in a range of modulation indices, the second modulation index is any value in the range of modulation indices, the first predetermined number is equal to the memory depth of encoding rules;

a branch metric acquisition unit 110, used for obtaining a branch metric for each branch path at the current moment based on each local ideal signal and a received signal corresponding to the local ideal signal;

an addition comparison selection 120—survivor path determination—metric recording unit, used for obtaining each modulation index error correction path metric for the current moment based on the branch metric for each state at the current moment, and at least one of a survivor path metric for a survivor path of the previous moment and a third predetermined number of surviving branch metrics for the survivor path of the previous moment, comparing modulus of each modulation index error correction path metric into the same state, and obtaining the survivor path metric, survivor paths and information bits before encoding for each state at the current moment that satisfies the requirements;

a state jumping and backtracking output unit 130, used for jumping to each state of a next moment until a backtracking predetermined requirement is reached in response to a determination that the received signal is a non-ending signal, and backtracking any of the survivor paths of each state at the current moment, and outputting the information bits corresponding to a backtracking moment.

It is understood that each of the above units can be either a functional module corresponding to the program for the implementation of the aforementioned encoded signal demodulation method, or a hardware chip or hardware chip area capable of implementing each function.

In order to realize information demodulation, the local ideal signal acquisition unit 100 is needed to obtain the local ideal signal corresponding to each state.

To do this it is first necessary to determine the specific state, in this embodiment, each state may be determined based on a first predetermined number of information bits and a fixed accumulated phase corresponding to a first modulation index.

Wherein the fixed accumulated phase can be obtained based on the first modulation index, the practical accumulated phase of a previous moment and each encoded information bits of the previous moment.

While for the practical accumulated phase of the first moment, i.e. the initial practical accumulated phase can be determined in a custom way.

For ease of understanding, each state is illustrated by the following examples:

for LE2S, the fixed accumulated phase corresponding to the first modulation index can be calculated by the following equation:

$$\theta_{n+1}^{state}=R_{2\pi}[\theta_n^{state}+\pi h_{state}(I_{n-L}^{c1}+I_{n-L}^{c2})]$$

wherein: $\theta_{n+1}^{state}$ represents the fixed accumulated phase at the current moment;

$\theta_n^{state}$ represents the fixed accumulated phase of the previous moment;

$h_{state}$ represents the first modulation index;

$I_{n-L}^{c1}$, $I_{n-L}^{c2}$ represent the sequence of encoded information bits about to leave at the previous moment;

$R_{2\pi}[*]$ represents taking the remainder of the angle value in [ ].

It is easy to understand that when performing the calculation of the fixed accumulated phase, the encoded information bits that are about to leave at the previous moment are shifted down by one $\pi h_{state}$ they are 0, therefore, when the encoded information bits about to leave at the previous moment are 0, the $I_{n-L}^{c1}$ or $I_{n-L}^{c2}$ in the above equation takes the value −1.

Understandably, the modulation index of LE2S ranges from 0.45 to 0.55, in one specific implementation, for ease of calculation, the first modulation index may take the value of ½, the initial accumulated phase is taken as 0, and the value of the sequence $I_{n-L}^{c1}$, $I_{n-L}^{c2}$ of encoded information bits about to leave at the previous moment may be 0 or 1, then after accumulation, all possible values of $\theta_{n+1}^{state}$ are 0, $\pi/2$, $\pi$, $3\pi/2$, a total of 4, and due to the parity nature of the phase accumulation, it can be simplified to 0, $\pi/2$, a total of 2 fixed accumulated phases.

And for LE8S, the sequence of encoded information bits that is about to leave the previous moment of the above equation is the sequence of 8 information bits after the spread spectrum encoding, 1100 is 0 after operation and 0011 is still 0 after operation, therefore, for LE8S, its fixed accumulated phase is always the fixed accumulated phase of the previous moment, which is always the initial phase as can be seen by step-by-step iterations, and if the custom initial phase is 0, then the fixed accumulated phase is always 0.

And the first predetermined number needs to be the same as the memory depth of the encoding, For LE2S and LE8S, the memory depth of the encoding used for convolutional encoding is 3, so the first predetermined number is 3 as well.

For LE2S, the first predetermined number is 3, the number of states will be determined by 3 information bits and 2 fixed accumulated phases, and since each information bit can take the value of 0 or 1, the number of states brought by 3 information bits will be 2×2×2=8, and when the influence of 2 fixed accumulated phases is added, the number of states will be 8×2=16, for example, if the specific state is expressed as a state variable $S_n$, there can be $S_n=(\pi/2, 0, 0, 0)$, $S_n=(0, 0, 0, 1)$, $S_n=(\pi/2, 0, 1, 1)$, and so on for a total of 16.

For LE8S, the first predetermined number is 3, the number of states will be determined by 3 information bits and 1 fixed accumulated phase, and since each information bit can take the value of 0 or 1, the number of states brought by 3 information bits will be 2×2×2=8, and considering that the fixed accumulated phase is a fixed value and can be removed from the state variables, the number of states becomes 8, for example, if the specific state is expressed as a state variable $S_n$, there can be $S_n=(0, 0, 0)$, $S_n=S_n=(0, 0, 1)$, $S_n=(0, 1, 1)$, and so on for a total of 8.

It should be noted that the first modulation index is a rational number within a range of modulation indices, so that the number of states can be limited. The value of the first modulation index can ensure that the encoded signal demodulation method provided by the embodiment of the present disclosure using the Viterbi algorithm has a small amount of operations to ensure the implementation of the encoded signal demodulation method.

After determining each state, further obtaining a phase-free information waveform for each state at the current moment, it is understood that the phase-free information waveform at the current moment is the phase-free information waveform for the period from the previous moment before the current moment to the current moment.

Since for devices, the received signal is the encoded signal, to facilitate the subsequent comparison of the local ideal signal with the decoded information and to calculate the difference between the two, the calculation of the local ideal signal can be based on the encoded information bits corresponding to the different information bits before encoding, so that the phase-free information waveform can be obtained based on the encoded information bits, while the phase-free information waveform of the current moment will be influenced by the phase-free information waveform before the current moment, so in order to obtain the phase-free information waveform of the current moment, a second predetermined number of encoded information bits before the current moment, a second modulation index, and encoded information bits after the current moment can first be selected to form each phase-free information waveforms with longer time span corresponding to the second predetermined number of encoded information bits before the current moment and the encoded information bits after the current moment, then the phase-free information waveform corresponding to the encoded information bits of the current moment is intercepted, i.e., the phase-free information waveform of each state at the current moment can be obtained.

Of course, according to encoding rules, if the memory depth of the encoding is 3, i.e., the acquisition of the encoded information bits of the current moment is based on the 3 information bits before encoding before the current moment and the information bits before encoding of the current moment, then the same number of information bits as the memory depth of encoding can be selected when constructing the phase-free information waveform, and the number of encoded information bits (the second predetermined number) can be obtained based on encoding rules, for example: according to the code rate of ½, the number of encoded information bits can be 6, then, the phase-free information waveform can be obtained based on the 6 encoded information bits before the current moment and the 2 encoded information bits at the current moment.

However, as the number of coded information bits used in obtaining the phase-free information waveform increases, the number of phase-free information waveforms obtained increases, and the selection is more complicated, therefore, in another specific embodiment, the number of encoding information bits before encoding corresponding to the second predetermined number of encoded information bits may differ from the memory depth of encoding rules, for example:

For LE2S and LE8S, according to the aforementioned encoding rules, 1 information bit at the current moment will get 2 information bits after encoding, so the encoded information bits at the current moment are 2 information bits, in one specific embodiment, for LE2S, the second predetermined number may be 2, which corresponds to 1 information bit before encoding, and for LE8S, the second predetermined number may be 1, which is 4 after spread spectrum.

In addition, the second modulation index can be any value in the range of modulation indices, for example, for LE, the second modulation index can be any value from 0.45 to 0.55.

In order to simplify the operation and avoid the possible errors caused by the use of different modulation indices in demodulation, the second modulation index can be selected as the first modulation index.

In order to take into account the devices within the modulation index range and improve the demodulation performance, the second modulation index may also be an endpoint performance balancing value modulation index, so that the performance at the endpoints of the modulation index range can be taken into account, the endpoint performance balancing value modulation index is usually the value in the middle region of the modulation index range, which may be close to one of the endpoints.

In order to improve the demodulation accuracy, the modulation index can also be estimated based on the signal head of the signal to be demodulated to obtain an estimated modulation index, and the second modulation index can be the estimated modulation index.

Further, to improve the demodulation speed, it is specifically possible to traverse the second predetermined number plus 2 number of encoded information bits in advance to obtain each phase-free information waveform for each longer interval, and then intercept the waveform corresponding to the current moment to obtain each phase-free information waveform for the current moment to form a phase-free information waveform table, when specifically demodulating, it is sufficient to look up only the second predetermined number of encoded information bits before the current moment for the specific state jumping, and the value of the encoded information bits taken at the current moment.

Of course, since the modulation index is a range, considering that one of the modulation indices may be selected for demodulation in practice, each phase-free information waveforms corresponding to multiple modulation indices can be obtained and stored in advance, and the waveforms can also be corrected accordingly based on the deviation of the modulation index.

Thus, a phase-free information waveform corresponding to the state corresponding to the current first predetermined number of information bits before the current moment can be obtained.

In order to obtain the local ideal signal, in addition to obtaining the phase-free information waveform of each state, it is also necessary to obtain the practical accumulated phase of each state, which corresponds to each state at the current moment. For LE8S, due to the special nature of the spread spectrum coding (as described earlier), when the initial practical accumulated phase is selected to be 0, the practical accumulated phase is always 0 and is not required to be calculated; the following describes the calculation method of LE2S.

Specifically, the practical accumulated phase is obtained based on the second modulation index, the practical accumulated phase of the previous moment and each encoded information bits of the previous moment.

It can be understood that for the practical accumulated phase of the first moment, i.e. the initial practical accumulated phase can be determined in a custom way.

As before, the second modulation index can be any value in the range of modulation indices, and the second modulation index used in obtaining the practical accumulated phase is the same as the second modulation index for phase-free information waveform.

The practical accumulated phase can be obtained by the following formula:

$$\theta_{n+1}^{use} = R_{2\pi}[\theta_n^{use} + \pi h_{use}(I_{n-L_c}^{c1} + I_{n-L_c}^{c2})]$$

wherein: $\theta_{n+1}^{state}$ represents the fixed accumulated phase at the current moment;

$\theta_n^{state}$ represents the fixed accumulated phase of the previous moment;

$h_{state}$ represents the first modulation index;

$I_{n-L}^{c1}$, $I_{n-L}^{c2}$ represent the sequence of encoded information bits about to leave at the previous moment;

$R_{2\pi}[*]$ represents taking the remainder of the angle value in [ ].

It is easy to understand that, as in the calculation of the fixed cumulative phase, in the calculation of the actual cumulative phase, the information bits after encoding that are about to leave at the previous moment are shifted down by one $\pi h_{use}$ if they are 0, therefore, when the encoded information bit about to leave at the previous moment is 0, the $I_{n-L}^{c1}$ or $I_{n-L}^{c2}$ in the above equation takes the value −1. It can be understood that when the second modulation index is equal to the first modulation index, the practical accumulated phase is equal to the fixed accumulated phase, thus the amount of operations can be reduced.

And when the practical accumulated phase is different from the fixed accumulated phase, i.e., the second modulation index is different from the first modulation index, so that the practical accumulated phase is separated from the fixed accumulated phase, either the endpoint performance balancing value modulation index or the estimated modulation index can be chosen as the second modulation index, in this way, on the one hand, the number of states can be reduced by using the first modulation index to determine the states, and on the other hand, the error due to the endpoints of the first modulation index deviating from the modulation index range can be reduced, the error between the second modulation index corresponding to the practical accumulated phase value and the modulation index of the received signal itself can be small, and the cumulative error effect between the local ideal signal and the received signal will be greatly reduced, and the similarity between the two will be greatly increased.

After obtaining the practical accumulated phase and phase-free information waveforms, further obtaining the local ideal signal corresponding to each state at the current moment.

Specifically, the local ideal signal can be obtained by the following formula:

$$W(k) = w(k)e^{j\theta^{use}}$$

wherein: $W(k)$ represents the kth sample point of the local ideal signal at the current moment;

$w(k)$ represents the kth sample point of the phase-free information waveform at the current moment;

$\theta^{use}$ represents the practical accumulated phase;

j represents imaginary unit.

As before, when the first predetermined number is 3 and the first modulation index is ½, the number of states is 16, and combined with the information bits of the current moment, the obtained local ideal signals are 32.

After obtaining the local ideal signal, the branch metric acquisition unit 110 obtains the branch metric of the two based on the received signal. The received signal is of course the signal corresponding to the time of the local ideal signal.

Specifically, the branch metric is obtained by the following formula:

$$BM_n = \langle W(k), R(k) \rangle = \sum_{k=1}^{N_{spb}} W(k)R(k)$$

wherein: $BM_n$ represents the branch metric for the current moment;

$W(k)$ represents the kth sample point of the local ideal signal at the current moment;

$R(k)$ represents the kth sample point of the received signal at the current moment;

$N_{spb}$ represents the number of samples corresponding to each information bit.

It is understood that the kth sample point of the local ideal signal at the current moment and the kth sample point of the received signal at the current moment correspond to each sample points of the encoded information bits.

Of course, the obtained branch metric can directly correspond to the information bits before encoding, thus it can also be understood as the branch metric of the information bits before encoding, so that the information bits before encoding can be directly obtained after the subsequent operation.

After obtaining branch metric at the current moment, the addition comparison selection (ACS)—survivor path determination—metric recording unit 120 further obtains the modulation index error correction path metric.

It should be noted that the modulation index error correction path metric in this embodiment refers to the corrected path metric that takes into account the error caused by the modulation index, and the path metric that takes into account the error but is not processed.

It is easy to understand that the branch metric of the current moment is the branch metric of each branch path from the previous moment to the time corresponding to the current moment, each modulation index error correction path metric for the current moment is the modulation index error correction path metric from a moment to the corresponding time of the current moment.

Wherein the correspondence between the branch metric of each state at the current moment and one of the survivor path metric of the survivor paths of the previous moment or the second predetermined number of surviving branch metrics is determined based on the state jumping rules.

Specifically, when jumping from the nth moment to the (n+1)th moment, each state at the nth moment is denoted by $S_n$ and each state at the (n+1)th moment is denoted by $S_{n+1}$, and the state jumping rule can be:

$S_n \rightarrow S_{n+1}$, that is: $(\theta_n^{state}, I_{n-Lc}, I_{n-Lc+1}, \ldots, I_{n-1}) \rightarrow (\theta_{n+1}^{state}, I_{n-Lc+1}, I_{n-Lc+2}, \ldots, I_n)$ Wherein, $I_n$ represents new incoming signal bits of new state before encoding;

$I_{n-Lc}$ represents the signal bits of the old states about to leave before encoding;

$\theta_n^{state}$ represents the fixed accumulated phase of the old state;

$\theta_{n+1}^{state}$ represents the fixed accumulated phase of the new state.

For the purpose of illustrating the status jumps, the following examples are given:

For a state at the nth moment, denoted as (0, 1, 0, 0, 1), which may become one of the states at the n+1th moment after a state jump, can be denoted as (π/2, 0, 0, 0, 1), then the path connecting the state at the nth moment (0, 1, 0, 0) with the state at the n+1th moment (π/2, 0, 0, 1) is the branch path, and the preferred path before reaching the state (0, 1, 0, 0) at the nth moment is the survivor path to the state (0, 1, 0, 0, 1) at the nth moment, i.e., the survivor path of the previous moment.

Then for a state at the n+1th moment, it is always possible to find a jump from a certain two states at the nth moment. In turn, it is possible to obtain the survivor paths and two branch paths of the two states at the nth moment corresponding to a state at the n+1th moment.

In turn, for each state at the n+1th moment, it is possible to find the respective states that correspond to them before the jump and obtain the survivor paths of each state, as well as to realize the path continuation relationship between the branch path at the current moment and the survivor path at the previous moment.

Based on the state jumping rules, two states at the previous moment will jump to the same state at the current moment along their respective paths, i.e. two branch paths correspond to one state.

In one specific embodiment, the addition comparison selection—survivor path determination—metric recording unit 120, used for obtaining the branch path of the current moment and each survivor path of the previous moment for each state of the current moment based on each state at the current moment and state jumping rules; obtaining the third predetermined number of each surviving branch metric on each survivor path near the current moment to obtain each proximity branch metric; obtaining the sum of the branch metric and each proximity branch metric at the current moment based on each survivor path and its corresponding branch path to obtain the modulation index error correction path metric for each state at the current moment.

Combining each state of the current moment and the state jumping rules to obtain the branch path corresponding to each state of the current moment, i.e., the path of jumping from a state of the previous moment to a state of the current moment, and each survivor path of the previous moment, finally obtaining the path continuation relationship between the branch path at the current moment and the survivor path at the previous moment.

Then obtaining the third predetermined number of each surviving branch metric along each survivor path in turn, and of course, the third predetermined number means that the third predetermined number of surviving branch metrics needs to be obtained on each survivor path, and is referred to as the proximity branch metric.

Based on the survivor path, obtaining the sum of each proximity branch metric to the nth moment, and based on the state jumping rules, obtaining the branch paths that continue to extend along each survivor path to jump from the state at the nth moment to the state at the n+1th moment, and then the branch metric corresponding to each branch path is obtained, and the branch metric is added to obtain the modulation index error correction path metric for each state at the n+1th moment.

Specifically, the modulation index error correction path metric for any of the states can be obtained by the following formula:

$$PM_n = \sum_{k=n-lseg+1}^{n-1} BM_k + BM_n$$

wherein: $PM_n$ represents the modulation index error correction path metric at the current moment;

lseg represents the third predetermined number;

$BM_k$ represents the branch metric corresponding to moment k in the proximity branch metric;

$BM_n$ represents the branch metric for the current moment (the nth moment).

Of course, the survivor paths corresponding to each proximity branch metric in the above formula have a state jumping path extension relationship at different moments from the branch metric at the current moment, for any state of the current moment, obtaining the modulation index error correction path metric of the current moment based on the above formula, and then the modulation index error correction path metric of the current moment can be obtained for each state, and there are two modulation index error correction path metrics for each state of the current moment.

It can be seen that, in this embodiment, when obtaining the modulation index error correction path metric, only each surviving branch metric near the current moment and the branch metric at the current moment are used to obtain the modulation index error correction path metric for each state, thus, the deviation between the local ideal signal and the received signal at the early stage due to time extension can be reduced, and the accuracy of the modulation index error correction path metric can be improved, thus achieving improved demodulation performance.

In another specific embodiment, the addition comparison selection—survivor path determination—metric recording unit 120, used for obtaining the branch path of the current moment and each survivor path of the previous moment for each state of the current moment, and a survivor path metric for each survivor path, based on each state at the current moment and state jumping rules; performing impact attenuation on each survivor path metric to obtain each attenuated path metric; obtaining a sum of the branch metric and the attenuated path metric at the current moment based on each survivor path and its corresponding branch path, and obtaining the modulation index error correction path metric for each state at the current moment.

The specific way to obtain each survivor path and each branch path is described previously and will not be repeated here.

Once the survivor path is obtained, the corresponding survivor path metric can be obtained based on the survivor path.

It is easy to understand that the survivor path metric is obtained based on the acquisition, comparison and selection of the modulation index error correction path metric at the previous moment, which can be stored after it is obtained in the previous moment for the convenience of the later moment.

After obtaining the survivor path metric, in order to reduce the error impact of the survivor path metric of the previous moment on the modulation index error correction path metric of the current moment, it can be attenuated to obtain each attenuated path metric.

Specifically, each attenuated path metric can be obtained by multiplying the survivor path metric by an attenuation factor of less than 1.

In one specific implementation, for ease of hardware implementation, the attenuation factor can be obtained by the following formula:

$$\eta = 1 - \frac{1}{2^m}$$

wherein: $\eta$ represents an attenuation factor;

m represents positive integer.

m can be any positive integer, such as 1, 2, 3, etc. The above formula to obtain the attenuation factor simplifies the logic of obtaining the attenuation factor, and also reduces the amount of calculation when obtaining the modulation index error correction path metric.

For a state at the current moment, combining the survivor paths and state jumping rules to obtain each branch path to a state and each survivor path before the state jumping, then the attenuated path metric of the survivor paths corresponding to the mutual continuation is added with the branch metric of each branch path to obtain the modulation index error correction path metric of a state at the current moment, until the modulation index error correction path metric of all states at the current moment is obtained.

Specifically, the modulation index error correction path metric is obtained by the following formula:

$$PM_n = \eta \cdot PM_{n-1} + BM_n$$

wherein: $PM_n$ represents the modulation index error correction path metric at the current moment;

$PM_{n-1}$ represents the survivor path metric for survivor paths at the previous moment;

$\eta$ represents attenuation factor;

$BM_n$ represents the branch metric for the current moment.

It is easy to understand that the above formula is applicable to the acquisition of the modulation index error correction path metric for each state at the current moment, but there is a path extension correspondence between the survivor path corresponding to the survivor path metric of the survivor path at the previous moment and the branch path corresponding to the branch metric at the current moment.

For any state of the current moment, obtaining the modulation index error correction path metric of the current moment based on the above formula, and then the modulation index error correction path metric of the current moment can be obtained for each state, and there are two modulation index error correction path metrics for each state of the current moment.

It can be seen that when obtaining the modulation index error correction path metric, multiplying the survivor path metric by an attenuation factor of less than 1 can reduce the deviation between the early local ideal signal and the received signal from accumulating and becoming larger due to the time extension, and improve the accuracy of the modulation index error correction path metric, thus achieving improved demodulation performance, moreover, when obtaining the modulation index error correction path metric, only the survivor path metric of the previous moment and the branch metric of the current the nth moment need to be obtained, and the operation process is relatively simple.

In another specific embodiment, the addition comparison selection—survivor path determination—metric recording unit 120, used for obtaining the branch path of the current moment and each survivor path of the previous moment for each state of the current moment, and obtaining the third predetermined number of surviving branch metrics for each survivor path of the previous moment and the survivor path metrics for each survivor path of the previous moment, based on each state at the current moment and state jumping rules; determining an extension path based on the extension relationship between the survivor path and the branch path, obtaining a metric sum of a third predetermined number of surviving branch metrics located on the same extension path and a branch metric at the current moment, and a modulus of the metric sum; obtaining a modulus of the metric sum on each same extension path and the sum of the survivor path metrics of the survivor paths of the previous moment to obtain the modulation index error correction path metric for each current moment.

The specific way to obtain each survivor path and branch path will not be repeated here.

After obtaining the survivor paths, further along each survivor path, obtaining the third predetermined number of surviving branch metrics and survivor path metrics for each survivor path.

Then the survivor paths of the previous moment with extension relationship and the branch paths of the current moment are determined as extension paths, and each extension path is obtained.

Obtaining a metric sum of a third predetermined number of surviving branch metrics and a branch metric at the current moment located on the same extension path and a modulus of the metric sum, further, obtaining a metric sum of the third predetermined number of surviving branch metrics located on the same extension path and a branch metric at the current moment, and thereby obtaining the modulus of the metric sum.

Specifically, the modulus of the metric sum is obtained by the following formula:

$$temp_n = \left| \sum_{k=n-lseg+1}^{n} BM_k \right|$$

wherein: $temp_n$ represents the modulus of the metric sum;

$BM_k$ represents the branch metric corresponding to moment k;

lseg represents the third predetermined number.

In another specific embodiment, the modulus of the metric sum can also be obtained by the following formula:

$$temp_n = \left| \sum_{k=n-lseg+1}^{n} BM_k \right|^2$$

wherein: $temp_n$ represents the modulus of the metric sum;

$BM_k$ represents the branch metric corresponding to moment k;

lseg represents the third predetermined number.

After obtaining each modulus of the metric sum, further obtain each modulation index error correction path metric.

Specifically, the modulation index error correction path metric can be obtained by the following formula:

$$PM_n = PM_{n-1} + temp_n$$

wherein: $PM_n$ represents the modulation index error correction path metric at the current moment;

$PM_n$ represents the survivor path metric for survivor paths at the previous moment;

$temp_n$ represents the modulus of the metric sum.

In this way, when obtaining the modulation index error correction path metric, the modulation index error correction path metric is further calculated by using the modulus of the metric sum, which can reduce the situation that the deviation between the local ideal signal and the received signal at the early stage becomes larger and larger due to the accumulation of time, and improve the accuracy of the modulation index error correction path metric, thus achieving improved demodulation performance.

After obtaining each modulation index error correction path metric, the addition comparison selection—survivor path determination—metric recording unit 120 compares each modulation index error correction path metric entering (jumping to) the same state at the current moment, and obtains the survivor path metric, survivor paths and information bits before encoding for each state at the current moment that satisfies the requirements.

After obtaining each modulation index error correction path metric, comparing each modulation index error correction path metric entering (jumping to) the same state at the current moment, and obtaining the survivor path metric, survivor paths and information bits before encoding for each state at the current moment that satisfies the requirements.

In one specific implementation, the largest modulation index error correction path metric among the various modulation index error correction path metrics that jump to the same state at the current moment can be selected, specifically, the survivor path, the survivor path metric, and the information bits before encoding can be determined based on the output of the comparison judgment being 0 or 1. For example, if the modulus of the modulation index error correction path metric of path A is greater than the modal value of the modulation index error correction path metric of path B, the output is 0, otherwise the output is 1, then when 0 is received, it is determined that path A is the survivor path, the modulation index error correction path metric of path A is the survivor path metric, and the information bits before encoding of the current moment of path A are the information bits before encoding that are determined to be acquired by this state.

It is easy to understand that the branch paths that jump from the previous moment to the same state of the current moment are two, and after comparison, the branch path that meets the requirements is superimposed on the survivor path of the previous moment as the survivor path.

In order to facilitate the determination of the survivor path at the next moment and the execution of the subsequent steps, in a specific implementation, after obtaining the survivor path at the current moment, at least one of the surviving branch metric corresponding to the survivor path of each state at the current moment and the survivor path metric of each state at the current moment can also be recorded so that it can be easily obtained at the next moment.

Of course, depending on how the modulation index error correction path metric is obtained, one can choose to record the surviving branch metric for each state at the current moment or the survivor path metric for each state at the current moment, or both. Of course, it is easy to understand that when using the surviving branch metric to obtain the modulation index error correction path metric, at least the surviving branch metric of each state at the current moment needs to be recorded; when using the survivor path metric to obtain the modulation index error correction path metric, that is, the surviving branch metric of each state at the current moment can be recorded, and the survivor path metric of each state at the current moment can also be recorded, but the latter can reduce the amount of operations and improve the efficiency of demodulation.

The state jumping and backtracking output unit 130, used for jumping to each state of a next moment until a backtracking predetermined requirement is reached in response to a determination that the received signal is a non-ending signal, and backtracking any of the survivor paths of each state at the current moment, and outputting the information bits before encoding corresponding to a backtracking moment.

After obtaining the survivor path and the information bits of the current moment, determining whether the received signal is the ending information, and if it is not the ending signal, the subsequent signal processing is required, then determining whether the backtracking requirement is satisfied, and jump to the next state; if it is the ending information, it means that all the signals in the current signal packet have been sent, so the next moment signal processing is not required, only the signal of the survivor path is needed to be output.

Referring to the previous description of the state jumping rules, which will not be repeated here.

If the predetermined backtracking requirement is met, performing backtracking, in a specific implementation, the predetermined backtracking requirement may be a predetermined backtracking depth, for example, the backtracking depth is set to 10, and when current signal of the received signal is the information bits of the first moment, no backtracking since the predetermined backtracking requirement is not satisfied, and when the received signal is the information bit of the 11th moment, the backtracking is performed based on the backtracking depth of 10, and it is known that the backtracking requirement has been satisfied, then any of the survivor paths of each state at the current moment is selected and backtracked, and then outputting the information bits before encoding corresponding to the backtracking moment.

It is understood that the corresponding backtracking moment described herein refers to the backtracking moment corresponding to the current moment according to the predetermined backtracking requirement.

For example, when the received signal is the information bits of the 11th moment, and the backtracking is performed based on the backtracking depth of 10, the corresponding backtracking moment is the 1st moment, i.e., the information bits of the 1st moment are output, and when the received signal is the information bits of the 12th moment, the backtracking is performed based on the backtracking depth of 10, the corresponding backtracking moment is the 2nd moment, and the information bits of the 2nd moment are output.

If the signal in the signal package has other signals to assist in demodulation after the signal that also contains specific information, then other signals can be implemented to backtrack and meet the output of the signal with specific information.

Of course, to be consistent with the processing of the tail signal and to facilitate processing, the survivor path with the largest survivor path metric for each state at the current moment can also be selected for backtracking.

In another specific implementation, when the signal in the signal package contains only the signal of specific information, i.e., the ending signal is also required to be demodulated to achieve the acquisition of the signal, but cannot meet the aforementioned backtracking requirements, for this purpose, the state jumping and backtracking output unit of the demodulation apparatus provided by embodiments of the present disclosure, may be also further used for:

backtracking the survivor path of each state of the current moment with the largest survivor path metric in response to a determination that the received signal is an ending signal, and outputting a sequence of information bits before encoding after the corresponding backtracking moment to the ending signal.

If the received signal is an ending signal, the output of the current signal cannot be achieved by backtracking, in this case, the survivor path with the largest survivor path metric is obtained by comparing the survivor path metric of each state at the current moment, then obtaining the sequence of information bits before encoding from the signal after the corresponding backtracking moment to the ending signal by backtracking the largest survivor path of the survivor path metric at the current moment, and obtaining the demodulated signal of all signals.

In this way, the encoded signal demodulation apparatus provided by embodiments of the present disclosure can ensure the feasibility of the modulation method provided by the embodiment of the present disclosure using the Viterbi algorithm by using the rational number within the range of modulation indices as the first modulation index on the one hand, and determining each state using the fixed accumulated phase corresponding to the first modulation index, so that the device with modulation index range has a controllable number of states. At the same time, determines the practical accumulated phase based on the second modulation index, the practical accumulated phase of the previous moment and each encoded information bits of the current moment, so that the practical accumulated phase is different from the fixed accumulated phase, which can reduce the large error caused by the first modulation index corresponding to the fixed accumulated phase; further, to ensure the accuracy of the subsequent survivor path determination and to avoid the accumulation of errors due to the use of the second modulation index and the difference between the second modulation index and the first modulation index, obtains an error correction path metric for each modulation index at the current moment based on one of the current moment branch metric, and the survivor path metric for the survivor paths of the previous moment or the third predetermined number of branch metrics, and determines the survivor path metric, survivor path and information bits before encoding for each state by comparing the modulus of the modulation index error correction path metric to improve the accuracy of the determination of the survivor path metric, survivor path and information bits before encoding. Thereby, the encoded signal demodulation apparatus provided by the embodiments of the present disclosure can reduce the effect of errors caused by the modulation index and improve demodulation performance based on the realization of demodulation of signals from devices with a modulation index range, and meanwhile be able to achieve demodulation for encoding devices.

Figure 11:
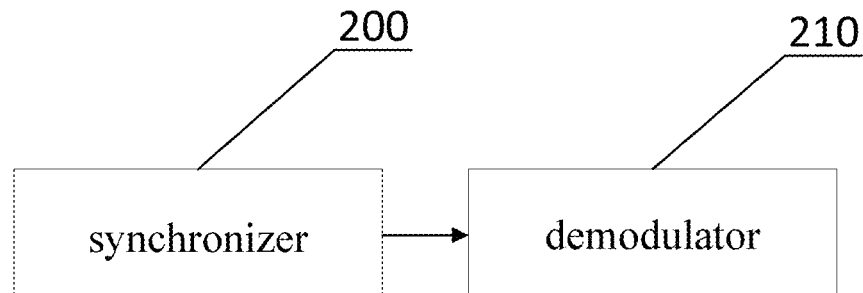
FIG. 11 is a block diagram of one architecture of the encoded signal demodulation device provided by embodiments of the present disclosure.

Of course, the embodiment of the present disclosure also provides a demodulation device, please refer to FIG. 11, which is a block diagram of one architecture of the encoded signal demodulation device provided by embodiments of the present disclosure.

The encoded signal demodulation device provided by the embodiment of the present disclosure may comprise a synchronizer 200 and a demodulator 210, wherein the synchronizer 200 obtains the initial signal of the signal to obtain a received signal, and transmits the received signal to the demodulator 210, the demodulator 210 performs the aforementioned encoded signal demodulation method. It is easily understood that the demodulator 210 includes a hardware chip or hardware chip area capable of implementing each of the aforementioned functions.

In one specific embodiment, the encoded signal demodulation device may be a Bluetooth.

In another specific implementation, the encoded signal demodulation device provided by the embodiment of the present disclosure can also be loaded with the above-mentioned program module architecture in the form of a program to implement the encoded signal demodulation method provided by the embodiment of the present disclosure, so as to achieve the need for simulation testing, etc.; the hardware device can be applied to an electronic device with specific data processing capabilities, which can be, for example, a terminal device or a server device.

Figure 12:
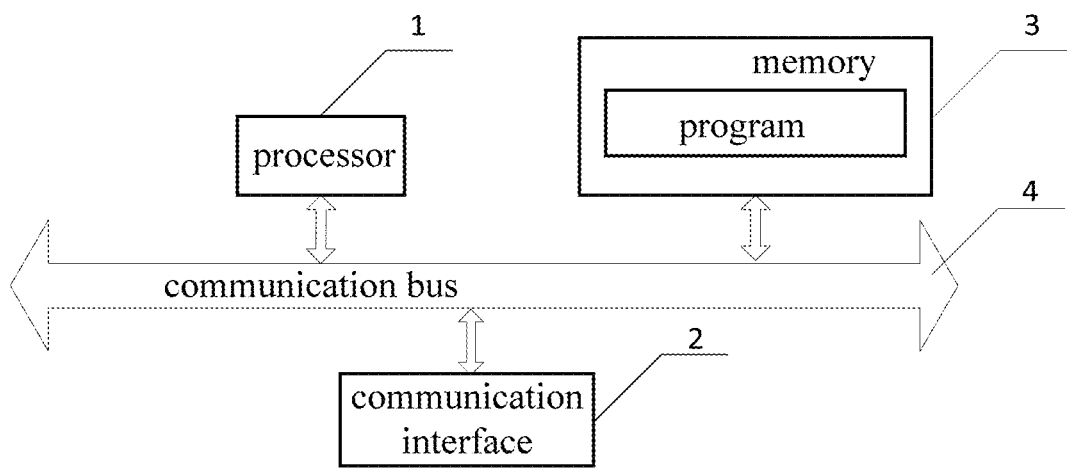
FIG. 12 is another optional hardware device architecture of the encoded signal demodulation device provided by embodiments of the present disclosure.

Optionally, FIG. 12 illustrates an optional hardware device architecture for the device provided by embodiments of the present disclosure, which may comprise: at least one memory 3 and at least one processor 1; the memory stores a program and the processor calls the program to perform the aforementioned encoded signal demodulation method, in addition to at least one communication interface 2 and at least one communication bus 4; processor 1 and memory 3 may be located in the same electronic device, for example, processor 1 and memory 3 may be located in a server device or a terminal device; processor 1 and memory 3 may also be located in different electronic devices.

As an optional implementation of the disclosure of embodiments of the present disclosure, the memory 3 may store a program and the processor 1 may call the program to execute the encoded signal demodulation method provided by the above embodiments of the present disclosure.

In embodiments of the present disclosure, the electronic device may be a tablet, laptop.

In this embodiment, the number of processor 1, communication interface 2, memory 3, and communication bus 4 is at least one, and the processor 1, communication interface 2, and memory 3 complete communication with each other through communication bus 4; obviously, the schematic communication connection of processor 1, communication interface 2, memory 3, and communication bus 4 shown in FIG. 12 is only an optional way.

Optionally, the communication interface 2 may be an interface of a communication module, such as an interface of a GSM module.

Processor 1 may be a central processing unit (CPU), or an Application Specific Integrated Circuit (ASIC), or one or more integrated circuits configured to implement embodiments of the present disclosure.

Memory 3 may contain high-speed RAM memory and may also include non-volatile memory (NVM), such as at least one disk memory.

It is noted that the apparatus described above may also include other devices (not shown) that may not be necessary for understanding the disclosure of embodiments of the present disclosure; since these other devices may not be necessary for understanding the disclosure of embodiments of the present disclosure, embodiments of the present disclosure will not be described individually in this regard.

The embodiment of the present disclosure also provides a computer readable storage medium, the computer readable storage medium stores computer-executable instructions, and when the instructions are executed by the processor, they can implement the encoded signal demodulation method as above.

The encoded signal demodulation device and the computer readable storage medium provided by the embodiment of the present disclosure, when performing signal demodulation, can ensure the feasibility of the modulation method provided by the embodiment of the present disclosure using the Viterbi algorithm by using the rational number within the range of modulation indices as the first modulation index on the one hand, and determining each state using the fixed accumulated phase corresponding to the first modulation index, so that the device with modulation index range has a controllable number of states. At the same time, determines the practical accumulated phase based on the second modulation index, the practical accumulated phase of the previous moment and each encoded information bits of the current moment, so that the practical accumulated phase is different from the fixed accumulated phase, which can reduce the large error caused by the first modulation index corresponding to the fixed accumulated phase; further, to ensure the accuracy of the subsequent survivor path determination and to avoid the accumulation of errors due to the use of the second modulation index and the difference between the second modulation index and the first modulation index, obtains an error correction path metric for each modulation index at the current moment based on one of the current moment branch metric, and the survivor path metric for the survivor paths of the previous moment or the third predetermined number of branch metrics, and determines the survivor path metric, survivor path and information bits before encoding for each state by comparing the modulus of the modulation index error correction path metric to improve the accuracy of the determination of the survivor path metric, survivor path and information bits before encoding. Thereby, the encoded signal demodulation method provided by the embodiments of the present disclosure can reduce the effect of errors caused by the modulation index and improve demodulation performance based on the realization of demodulation of signals from devices with a modulation index range, and meanwhile be able to achieve demodulation for encoding devices.

The embodiments of the present disclosure described above are combinations of elements and features of the present disclosure. Unless otherwise mentioned, the elements or features may be considered selective. Individual elements or features may be practiced without being combined with other elements or features. Alternatively, embodiments of the present disclosure may be constructed by combining some of the components and/or features. The order of operations described in the embodiments of the present disclosure may be rearranged. Some constructions of any one embodiment may be included in another embodiment and may be replaced by a corresponding construction of the other embodiment. It will be apparent to those skilled in the art that the claims of the appended claims that are not expressly referenced to each other may be combined in an embodiment of the disclosure or may be included as new claims in an amendment after the filing of this application.

Embodiments of the present disclosure may be implemented by various means such as hardware, firmware, software, or combinations thereof. In hardware configuration means, the methods according to embodiments of the present disclosure may be implemented by one or more specialized integrated circuits (ASICs), digital signal processors (DSPs), digital signal processor devices (DSPDs), programmable logic devices (PLDs), field programmable gate arrays (FPGAs), processors, controllers, microcontrollers, microprocessors, etc.

In a firmware or software configuration approach, implementations of some embodiments of the disclosure may be implemented in the form of modules, processes, functions, etc. The software code may be stored in a memory unit and executed by the processor. The memory unit is located inside or outside the processor and can send data to and receive data from the processor by various known means.

The foregoing description of the disclosed embodiments enables those skilled in the art to implement or use the present disclosure. A variety of modifications to these embodiments will be apparent to those skilled in the art, and the general principles defined herein can be implemented in other embodiments without departing from the spirit or scope of the present disclosure. Accordingly, the present disclosure will not be limited to these embodiments shown herein, but will conform to the widest scope consistent with the principles and novel features disclosed herein.

Although the embodiments of the present disclosure are disclosed as above, the present disclosure is not limited therein. Any person skilled in the art may make various changes and modifications without departing from the spirit and scope of the present disclosure, and therefore the scope of protection of the present disclosure shall be subject to the scope defined by the claims.

What is claimed is:

1. An encoded signal demodulation method, comprising:
    obtaining a local ideal signal of a transmitted signal corresponding to each encoding state of a number of states at a current time based on a phase-free information waveform of each encoding state at the current time and a practical accumulated phase corresponding to each encoding state at the current time,
    wherein each encoding state is determined based on a first predetermined number of information bits and each fixed accumulated phase corresponding to a first modulation index,
    wherein the local ideal signal is based on the first predetermined number of information bits included in each encoding state,
    wherein the fixed accumulated phase is obtained based on the first modulation index, a practical accumulated phase at a previous time, and each encoded information bit at the previous time,
    wherein the phase-free information waveform of each encoding state is obtained based on a second modulation index, a second predetermined number of encoded information bits before the current time, and each encoded information bit at the current time,
    wherein the practical accumulated phase is obtained based on the second modulation index, the practical accumulated phase at the previous time, and each encoded information bits at the previous time,
    wherein the first modulation index is a rational number in a range of modulation indices, the second modulation index is any value in the range of modulation indices, and the first predetermined number is equal to a memory depth of encoding rules;
    obtaining a branch metric for each branch path at the current time based on the local ideal signal and a received signal corresponding in time to the local ideal signal;
    obtaining first and second modulation index error correction path metrics for the first and second modulation indices at the current time based on the branch metric for each encoding state at the current time and at least one of a survivor path metric for a survivor path at the previous time or a third predetermined number of surviving branch metrics for the survivor path at the previous time; and
    in response to a determination that the received signal is not an ending signal, jumping to each encoding state at a next time until a backtracking predetermined requirement is satisfied, backtracking any of the survivor paths of each encoding state at the current time, and outputting demodulated information bits,
    wherein the method is performed by at least one processor.

2. The encoded signal demodulation method of claim 1, wherein obtaining the first and second modulation index error correction path metrics comprises:
    obtaining each branch path at the current time and each survivor path at the previous time for each encoding state at the current time based on each encoding state at the current time and state jumping rules;
    obtaining the third predetermined number of each surviving branch metric on each survivor path near the current time to obtain each proximity branch metric; and
    obtaining a sum of the branch metric and each proximity branch metric at the current time based on each survivor path and its corresponding branch path to obtain the first and modulation index error correction path metrics for each encoding state at the current time.

3. The encoded signal demodulation method of claim 2, wherein obtaining the first and second modulation index error correction path metrics is based on the following formula:

$$PM_n = \sum_{k=n-lseg+1}^{n-1} BM_k + BM_n$$

wherein: $PM_n$ represents the modulation index error correction path metric at the current time;
lseg represents the third predetermined number;
$BM_k$ represents the branch metric corresponding to time k in the proximity branch metric; and
$BM_n$ represents the branch metric for the current time (the nth time).

4. The encoded signal demodulation method of claim 1, wherein obtaining the first and second modulation index error correction path metrics comprises:
    obtaining each branch path at the current time and each survivor path at the previous time for each encoding state at the current time, and a survivor path metric for each survivor path, based on each encoding state at the current time and state jumping rules;
    performing impact attenuation on each survivor path metric to obtain each attenuated path metric; and
    obtaining a sum of the branch metric and the attenuated path metric at the current time based on each survivor path and its corresponding branch path, and obtaining the first and second modulation index error correction path metrics for each encoding state at the current time.

5. The encoded signal demodulation method of claim 4, wherein the first and second modulation index error correction path metrics are obtained by the following formula:

$$PM_n = \eta \cdot PM_{n-1} + BM_n$$

wherein: $PM_n$ represents the modulation index error correction path metric at the current time;

$PM_{n-1}$ represents the survivor path metric for survivor paths at the previous time;

η represents an attenuation factor; and $BM_n$ represents the branch metric for the current time.

6. The encoded signal demodulation method of claim 5, wherein the attenuation factor is obtained by the following formula:

$$\eta = 1 - \frac{1}{2^m}$$

wherein: η represents attenuation factor; and m represents positive integer.

7. The encoded signal demodulation method of claim 1, wherein obtaining the first and second modulation index error correction path metrics comprises:

obtaining each branch path of the current time and each survivor path at the previous time for each encoding state at the current time, and obtaining the third predetermined number of surviving branch metrics for each survivor path at the previous time and the survivor path metrics for each survivor path at the previous time, based on each encoding state at the current time and state jumping rules;

determining an extension path based on an extension relationship between the survivor path and the branch path and obtaining a metric sum of the third predetermined number of surviving branch metrics located on the same extension path and a branch metric at the current time; and obtaining a modulus of the metric sum on each same extension path and the sum of the survivor path metrics of the survivor paths of the previous time to obtain the first and second modulation index error correction path metrics.

8. The encoded signal demodulation method of claim 7, wherein the modulation index error correction path metric is obtained by the following formula:

$$PM_n = PM_{n-1} + temp_n$$

wherein: $PM_n$ represents the modulation index error correction path metric at the current time;

$PM_{n-1}$ represents the survivor path metric for survivor paths at the previous time; and $temp_n$ represents the modulus of the metric sum.

9. The encoded signal demodulation method of claim 8, wherein the modulus of the metric sum is obtained by the following formula:

$$temp_n = \left| \sum_{k=n-lseg+1}^{n} BM_k \right|$$

wherein: $temp_n$ represents the modulus of the metric sum;

$BM_k$ represents the branch metric corresponding to time k; and lseg represents the third predetermined number.

10. The encoded signal demodulation method of claim 8, wherein the modulus of the metric sum is obtained by the following formula:

$$temp_n = \left| \sum_{k=n-lseg+1}^{n} BM_k \right|^2$$

wherein: $temp_n$ represents the modulus of the metric sum;

$BM_k$ represents the branch metric corresponding to time k; and lseg represents the third predetermined number.

11. The encoded signal demodulation method of claim 1, wherein the encoded signal demodulation method further comprises:

in response to a determination that the received signal is an ending signal, backtracking the survivor path of each state at the current time with the largest survivor path metric, and outputting a sequence of demodulated information bits.

12. The encoded signal demodulation method of claim 1, wherein backtracking any of the survivor paths of each state at the current time, and outputting the demodulated information bits comprises:

backtracking the survivor path of each encoding state at the current time with the largest survivor path metric, and outputting the information bits corresponding to the backtracking time.

13. The encoded signal demodulation method of claim 1, wherein the second modulation index includes an endpoint performance balancing value modulation index, the first modulation index, or an estimated modulation index based on signal head estimation.

14. The encoded signal demodulation method of claim 1, wherein the method further comprises:

recording at least one of the surviving branch metric corresponding to the survivor path of each encoding state at the current time or the survivor path metric of each encoding state at the current time.

15. The encoded signal demodulation method of claim 1, wherein the local ideal signal is obtained by the following formula:

$$W(k) = w(k)e^{j\theta^{use}}$$

wherein: $W(k)$ represents a kth sample point of the local ideal signal at the current time;

$w(k)$ represents the kth sample point of the phase-free information waveform at the current time;

$\theta^{use}$ represents the practical accumulated phase; and j represents imaginary number.

16. The encoded signal demodulation method of claim 1, wherein the branch metric is obtained by the following formula:

$$BM_n = \langle W(k), R(k) \rangle$$
$$= \sum_{k=1}^{N_{spb}} W(k)R(k)$$

wherein: $BM_n$ represents the branch metric for the current time;

$W(k)$ represents the kth sample point of the local ideal signal at the current time;

$R(k)$ represents the kth sample point of the received signal at the current time; and $N_{spb}$ represents the number of samples corresponding to each information bit.

17. An encoded signal demodulation apparatus comprising a non-transitory computer readable medium storing instructions that, when executed by at least one processor, cause the at least one processor to:
- obtain a local ideal signal of a transmitted signal corresponding to each encoding state of a number of states at a current time based on a phase-free information waveform of each encoding state at the current time and a practical accumulated phase corresponding to each encoding state at the current time,
- wherein each encoding state is determined based on a first predetermined number of information bits and each fixed accumulated phase corresponding to a first modulation index,
- wherein the local ideal signal is based on the first predetermined number of information bits included in each encoding state,
- wherein the fixed accumulated phase is obtained based on the first modulation index, a practical accumulated phase at a previous time and each encoded information bits at the previous time,
- wherein the phase-free information waveform of each encoding state is obtained based on a second modulation index, a second predetermined number of encoded information bits before the current time, and each encoded information bits at the current time,
- wherein the practical accumulated phase at each current time is obtained based on the second modulation index, the practical accumulated phase at the previous time, and each encoded information bit at the previous time,
- wherein the first modulation index is a rational number in a range of modulation indices, the second modulation index is any value in the range of modulation indices, and the first predetermined number is equal to a memory depth of encoding rules;
- obtain a branch metric for each branch path at the current time based on the local ideal signal and a received signal corresponding in time to the local ideal signal;
- obtain first and second modulation index error correction path metrics for the first and second modulation indices at the current time based on the branch metric for each encoding state at the current time, and at least one of a survivor path metric for a survivor path at the previous time or a third predetermined number of surviving branch metrics for the survivor path at the previous time; and
- in response to a determination that the received signal is not an ending signal, jump to each encoding state at a next time until a backtracking predetermined requirement is satisfied, backtracking any of the survivor paths of each encoding state at the current time, and outputting demodulated information bits.

18. The encoded signal demodulation apparatus of claim 17, wherein obtaining the first and second modulation index error correction path metrics comprises:
- obtaining each branch path at the current time and each survivor path at the previous time for each encoding state at the current time, and obtaining the third predetermined number of surviving branch metrics for each survivor path at the previous time and the survivor path metrics for each survivor path at the previous time, based on each encoding state at the current time and state jumping rules;
- determining an extension path based on an extension relationship between the survivor path and the branch path and obtaining a metric sum of the third predetermined number of surviving branch metrics located on the same extension path and a branch metric at the current time; and
- obtaining a modulus of the metric sum on each same extension path and the sum of the survivor path metrics of the survivor paths at the previous time to obtain the first and second modulation index error correction path metrics.

19. The encoded signal demodulation apparatus of claim 17, wherein the instructions further cause the at least one processor to, in response to a determination that the received signal is an ending signal, backtrack the survivor path of each encoding state at the current time with the largest survivor path metric and output a sequence of demodulated information bits.

20. An encoded signal demodulation device, comprising a synchronizer and a demodulator, wherein the synchronizer is configured to obtain a received signal and transmit the received signal to the demodulator, and wherein the demodulator is configured to perform the encoded signal demodulation method of claim 1.

* * * * *